(12) United States Patent
Tatara et al.

(10) Patent No.: US 8,007,146 B2
(45) Date of Patent: Aug. 30, 2011

(54) VEHICLE LAMP

(75) Inventors: Naohisa Tatara, Shizuoka (JP);
Kazutami Oishi, Shizuoka (JP);
Michihiko Hayakawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 280 days.

(21) Appl. No.: 12/200,308

(22) Filed: Aug. 28, 2008

(65) Prior Publication Data

US 2009/0073706 A1 Mar. 19, 2009

(30) Foreign Application Priority Data

Sep. 14, 2007 (JP) ................................. 2007-239066
Jun. 19, 2008 (JP) ................................. 2008-160031

(51) Int. Cl.
*B60Q 1/00* (2006.01)
(52) U.S. Cl. ......... 362/464; 362/465; 362/466; 362/467
(58) Field of Classification Search .......... 362/464–466, 362/467–468
See application file for complete search history.

(56) References Cited

U.S. PATENT DOCUMENTS

| 4,985,816 | A | 1/1991 | Seko et al. | |
| 2001/0028565 | A1* | 10/2001 | Ishida | 362/464 |
| 2001/0040810 | A1* | 11/2001 | Kusagaya | 362/351 |
| 2002/0191413 | A1* | 12/2002 | Hayakawa et al. | 362/544 |
| 2003/0103358 | A1* | 6/2003 | Tatsukawa et al. | 362/539 |
| 2006/0177098 | A1 | 8/2006 | Stam | |
| 2007/0147055 | A1 | 6/2007 | Komatsu | |

FOREIGN PATENT DOCUMENTS

| FR | 2 088 708 | 1/1972 |
| JP | 2002-019517 | 1/2002 |
| JP | 2004-161082 | 6/2004 |

OTHER PUBLICATIONS

Communication from the Chinese Intellectual Property Office in connection with Chinese Patent Application No. 200810184217.7, pp. 1-4 (dated Dec. 14, 2010).

* cited by examiner

*Primary Examiner* — Robert May
(74) *Attorney, Agent, or Firm* — Fish & Richardson P.C.

(57) ABSTRACT

A vehicle lamp is arranged to switch between a low beam and a high beam. The high beam illuminates a first illumination area, which lies ahead of and square to a center of a vehicle, and a second illumination area, which includes portions lying horizontally further leftwards and right wards and vertically further upwards than the first illumination area. When switching from the low beam to the high beam, the luminous intensity of the second illumination area is increased and thereafter the luminous intensity of the first illumination area is increased. When switching from the high beam to the low beam, the luminance intensity of the first illumination area is decreased and thereafter the luminance intensity of the second illumination area is decreased.

2 Claims, 17 Drawing Sheets

VEHICLE LAMP

RELATED APPLICATION(S)

This application claims the benefit of priorities of Japanese application no. JP2007-239066, filed on Sep. 14, 2007 and Japanese application no. JP2008-160031, filed on Jun. 19, 2008. The disclosure of these applications is incorporated herein by reference.

TECHNICAL FIELD

The present disclosure relates to headlamps (headlights) of vehicles such as motor vehicles, and more particularly to a vehicle lamp which can switch between a main beam or high beam and a dip beam or low beam.

BACKGROUND

Headlamps of motor vehicles are made to switch between a high beam for illuminating a far-field area as well as a near-field area ahead of the subject vehicle and a low beam for illuminating ahead of the subject vehicle while preventing the dazzling of other vehicles such as oncoming vehicles and vehicles traveling ahead of the subject vehicle. However, the high beam and the low beam have their own light distribution patterns which are significantly different. The high beam illuminates mainly a road area which lies ahead of and square to the vehicle, whereas the low beam illuminates a near-field area directly in front of the vehicle and excludes the area which lies ahead of and square to the vehicle. Thus, the illuminating conditions ahead of the subject vehicle change significantly when the headlamps are switched from the high beams to the low beams or vice versa, and this causes the driver to feel a sensation of physical disorder or makes safe driving difficult. For example, when the headlamps are switched from the high beams to the low beams, since the illuminating conditions are switched from a state in which the wide area spreading ahead of the subject vehicle is illuminated with high luminance intensity to a state in which only the near-field area direct in front of the subject vehicle is illuminated with a lower luminance intensity than the high luminance intensity, the peripheral areas to the near-field area and the far-field area ahead of the subject vehicle get dark, whereby visibility is lowered, causing the driver to feel uneasy. In contrast, when the headlamps are switched from the low beams to the high beams, other vehicles traveling on the periphery of the near-field area or in the far-field area which have not been recognized by the driver of the subject vehicle until then due to insufficient illumination by the low beam are now illuminated with the high beam. As this occurs, drivers of the other vehicles are dazzled by the high beam of the subject vehicle, making safe driving difficult.

To deal with these problems, Japanese Patent Document JP-A-2002-19517 proposes a technique for enhancing far-field visibility of the subject vehicle while preventing the dazzling of preceding vehicles by configuring headlamps to control directions of optical axes of low beams, measuring an inter-vehicle distance between the subject vehicle and a preceding vehicle and deflecting vertically the optical axes of the low beams in accordance with the inter-vehicle distance so measured. In addition, Japanese Patent Document JP-A-2004-161082 proposes a technique for enhancing the forward visibility of the subject vehicle without dazzling the drivers of other vehicles by detecting other vehicles by a vehicle detection means, and independently controlling quantities of light of high beams and low beams of left and right headlamps based on a relative distance to other such vehicles.

Although the technique proposed by JP-A-2002-19517 can improve the far-field visibility of the subject vehicle by the illumination of the low beams, the technique does not eliminate the sensation of physical disorder that is felt by the driver when the headlamps are switched between the high beams and the low beams as has been described above and does eliminate dazzling of other vehicles. Although the technique proposed by JP-A-2004-161082 can illuminate the high beams and the low beams without dazzling other vehicles, the technique cannot solve the problems with the sensation of physical disorder and dazzling of other vehicles which are caused when the headlamps are switched between the high beams and the low beams.

SUMMARY

The invention has been made in view of the foregoing situations and, in some implementations, provides a vehicle lamp which can improve a transition state arising when the headlamp is switched between a high beam and a low beam so as not only to prevent the sensation of physical disorder felt by the driver but also to prevent the dazzling of other vehicles. Various aspects of the invention are set forth in the claims.

According to one aspect, a vehicle lamp is designed to switch between a low beam and a high beam, the high beam being made to illuminate a first illumination area which lies ahead of and square to a center of a vehicle and a second illumination area which includes portions lying horizontally further leftwards and right wards and vertically further upwards than the first illumination area. The vehicle lamp includes a lighting control for controlling the lighting state of the vehicle lamp so that when switching from the low beam to the high beam, the lighting control increases the luminous intensity of the second illumination area and thereafter increases the luminous intensity of the first illumination area. When switching from the high beam to the low beam, the lighting control decreases the luminance intensity of the first illumination area and thereafter decreases the luminance intensity of the second illumination area.

When the headlamp is switched from the low beam to the high beam, when the luminance intensity of the second illumination area is first increased, the peripheral area of the near-field area ahead of the subject vehicle is made bright, and following this, when the luminance intensity of the first illumination area is increased, the area lying ahead of and square to the subject vehicle is made bright as far as the far-field area. Thus, the whole area lying ahead of the subject vehicle is finally illuminated brightly with the predetermined luminance intensity. There occurs no situation where the area ahead of the subject vehicle is illuminated brightly in a drastic fashion, and hence, the driver does not feel the sensation of physical disorder. In contrast, when the headlamp is switched from the high beam to the low beam, first, the luminance intensity of only the first illumination area is decreased and the luminance intensity of the second illumination area is decreased a certain period of time after the decrease in luminance intensity of the first illumination area. Then, the illumination of the first illumination area and the second illumination area is finally switched off, allowing illumination only by a low beam lamp to continue. Because of this, the bright illumination of the peripheral area can be secured even when the illumination of the forward area of the subject vehicle is reduced. Since the illumination of the peripheral area is reduced thereafter, a drastic reduction in illumination of the forward or peripheral area of the subject vehicle can be prevented. Hence, there occurs no situation in which the driver feels uneasy resulting in an unsafe driving condition. Other features and advantages will be readily apparent from the following detailed description, the accompanying drawings and the claims.

BEST MODE FOR CARRYING OUT THE INVENTION

The vehicle headlamp preferably includes a preceding vehicle detector for detecting a vehicle residing ahead of the subject vehicle. A lighting control is arranged to switch the headlamp from the low beam to the high beam when an inter-vehicle distance to a preceding vehicle detected by the preceding vehicle detection means is equal to or larger than a first predetermined distance. When the preceding vehicle is traveling at a distance greater than the first predetermined distance, even though the headlamp is switched to the high beam, the preceding vehicle is not dazzled by the high beam, while the forward area of the subject vehicle is illuminated brightly so as to ensure safe driving of the vehicle. In addition, when the inter-vehicle distance to the preceding vehicle is equal to or larger than the first predetermined distance, the lighting control means increases the luminance intensity of only the second illumination area, whereas when the inter-vehicle distance is equal to or larger than a second predetermined distance larger than the first predetermined distance, the lighting control means increases the luminance intensity of the first illumination area. When the headlamp is switched to the high beam, the luminance intensity is allowed to be increased from the peripheral area to the front of the subject vehicle while preventing the dazzling of a preceding vehicle and the sensation of physical disorder felt by the driver can be prevented.

In another aspect, a vehicle lamp includes a preceding vehicle detector for detecting a vehicle residing ahead of a subject vehicle, wherein the lighting control controls the luminance intensity of the first illumination area or the second illumination area to a luminance intensity determined based on an inter-vehicle distance to a preceding vehicle detected by the preceding vehicle detection means. When the subject vehicle is traveling with a predetermined inter-vehicle distance maintained between the preceding vehicle and itself, the first and second illumination areas can be controlled to optimum luminance intensities for the inter-vehicle distance, thereby making it possible to increase the forward visibility of the subject vehicle while preventing the dazzling of the driver of the preceding vehicle.

The second illumination area is defined as any of an annular area which surrounds the first illumination area, areas lying horizontally leftwards and rightwards of the first illumination area or an area lying vertically upwards of the first illumination area, thereby making it possible to ensure safe driving of the subject vehicle by illuminating brightly the forward area thereof while preventing the sensation of physical disorder that is felt by the driver.

Embodiment 1

Figure 1:
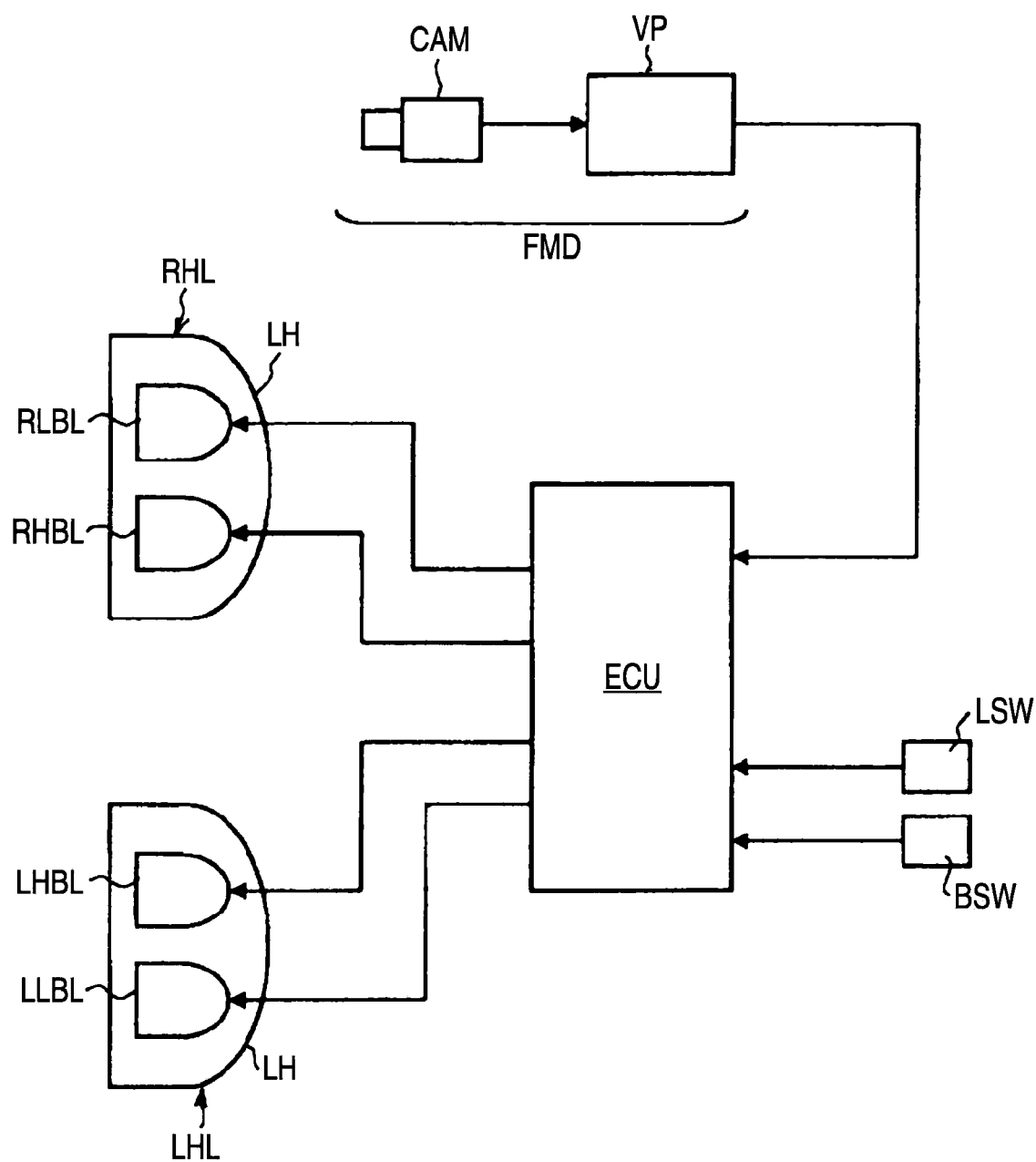
FIG. 1 is a block diagram showing an overall configuration of the invention.

Next, a first embodiment (Embodiment 1) of the invention will be described. FIG. 1 is a diagram showing an overall configuration of a vehicle lamp system, in which left and right headlamps LHL, RHL are connected to an lighting control means which is electronic control unit (ECU), and a lamp switch LSW and a beam switch (a dimmer switch) BSW, both of which are operated to be switched on and off by the driver, are also connected to the lighting control means ECU. The respective headlamps LHL, RHL are switched between high beams (main beams) and low beams (dip beams) by this beam switch BSW. In addition, a preceding vehicle detection means FMD is provided at a front part of a motor vehicle for detecting other vehicles such as oncoming vehicles and preceding vehicles which reside in a forward area lying ahead of the subject vehicle, whereby illumination control of the respective headlamps LHL, RHL by the lighting control means ECU is enabled based on a detection output from the preceding vehicle detection means FMD.

Figure 2:
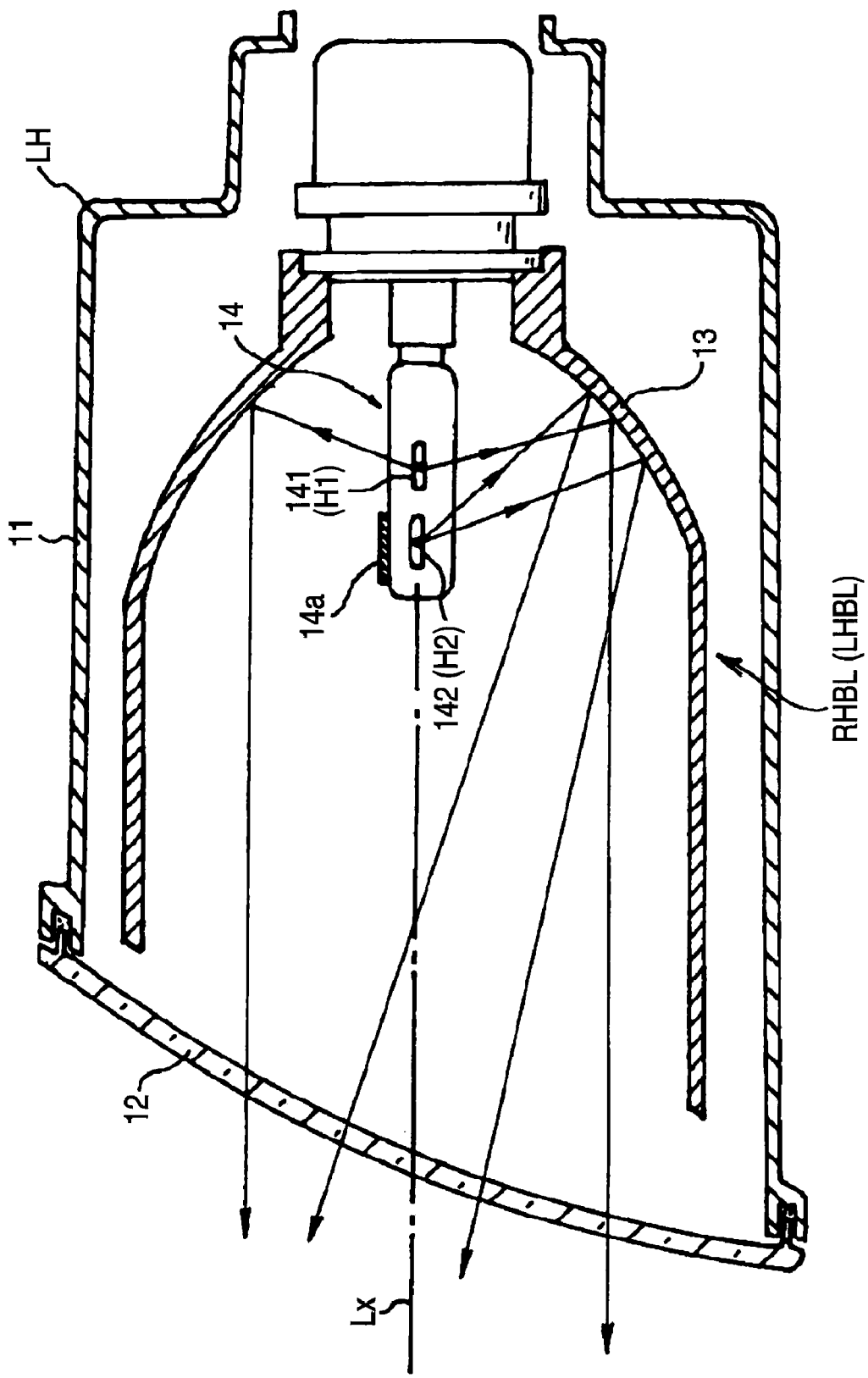
FIG. 2 is a sectional view showing a schematic configuration of a headlamp of Embodiment 1.
Figure 3:
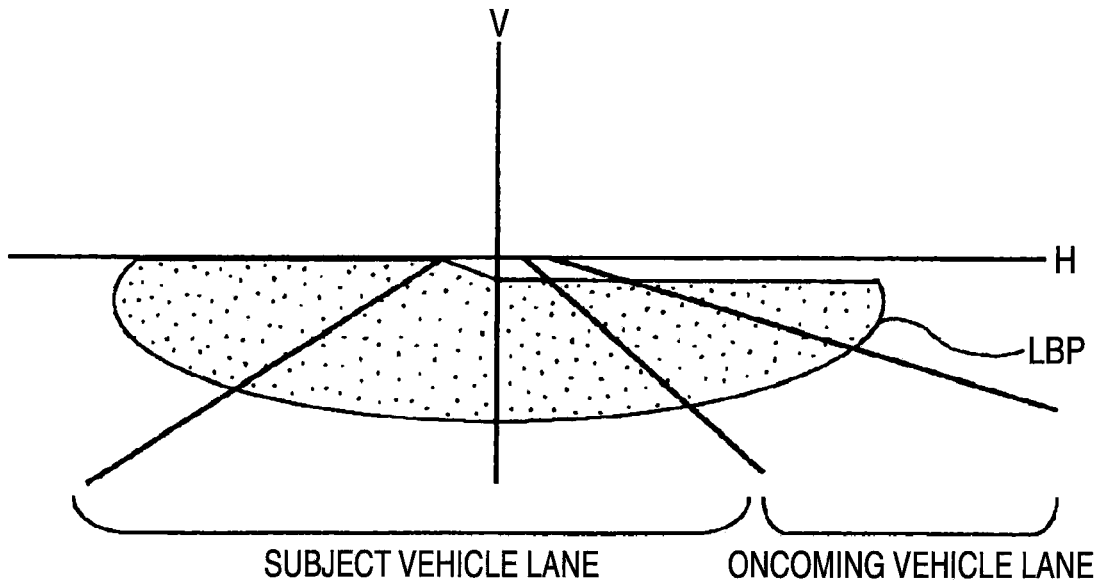
FIG. 3 shows a light distribution pattern diagram of a low beam and a high beam.
Figure 3:
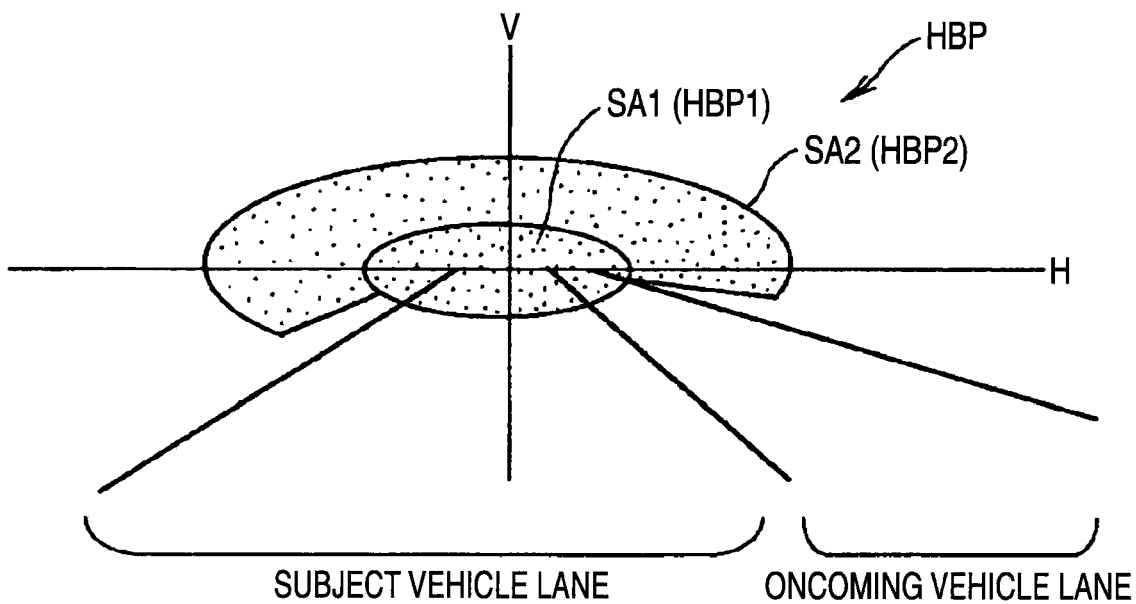

The left and right headlamps LHL, RHL have the same configuration except that their interior configurations are laterally symmetrical and are configured as a so-called four headlamp system in which a high beam lamp RHBL/LHBL and a low beam lamp LLBL/RLBL are installed in each lamp housing LH. FIG. 2 is a diagram showing a schematic configuration of the right head lamp RHL. The diagram shows the configuration of the high beam lamp RHBL installed in the lamp housing LH. In addition, since a conventional low beam lamp is applied to the low beam lamp RLBL, the description of the configuration thereof will be omitted here. However, when it is lit, as is shown in FIG. 3($a$), the low beam lamp RLBL illuminates a low beam light distribution pattern LBP which illuminates a near-field area direct in front of the subject vehicle. The lamp housing LH is made up of a lamp body 11 which has the shape of a vessel which is opened at the front thereof and a front lens 12 which is attached to the front opening of the lamp body 11. As is shown in FIG. 2, the high beam lamp RHBL has a reflector 13 formed as a paraboloid of revolution or a parabolic reflector. An H1 light source is disposed in a focal point position of the reflector 13, and an H2 light source is disposed slightly further forward than the H1 light source. Here, a so-called an H4 bulb 14 having two filaments incorporated therein is used, and an R filament 141 which lies on a rear side of the H4 bulb 14 is configured as the H1 light source, while an F filament 142 lying on a front side of the same bulb is configured as the H2 light source. In addition, a light shielding inner shade 14a is provided in an upper area of the F filament 142. Usually, when the H4 bulb 14 is used as a light source of two headlamp system, the inner shade 14a is attached to the reflector in such a manner as to be oriented to a lower side of the F filament 142. However, here, the inner shaft 14a is attached in such a manner as to be oriented to an upper side of the F filament 142. A high beam lamp LHBL of the left headlamp is configured in the same way.

In the headlamps RHL, LHL, when the R filament 141, that is, the H1 light source is lit, light reflected on the reflector 13 is emitted as a bundle of light rays which are substantially parallel to a lamp optical axis Lx, and the light rays are then collected by the front lens 12 to be formed into a light distribution pattern HBP1 which illuminates a first illumination area SA1 constituting a horizontally central illumination area lying ahead of and square to the subject vehicle. The first illumination area SA1 coincides with a lateral center of the subject vehicle. In addition, when the F filament 142 (i.e., the H2 light source) is lit, light emitted upwards is cut off or interrupted by the inner shade 14a, and only light emitted downwards is reflected on the reflector 13 so as to be directed forwards. Because of this, as is shown in FIG. 3(b), the light emitted is formed into a light distribution pattern HBP2 which illuminates a semi-annular second illumination area SA2 which lies horizontally leftwards and rightwards and vertically upwards of the first illumination area SA1. In addition, by these light distribution patterns HBP1 and HBP2 being superposed one on the other, a high beam light distribution pattern HPB results.

The preceding vehicle detection means FMD includes, as is shown in FIG. 1, an image sensing device or camera CMD which uses a solid-state image sensor such as CCD or MOS and an image recognition device VP which converts an optical image sensed and formed by the image sensing camera CAM into electronic signals to analyze the image, recognizes preceding vehicles such as oncoming vehicles and vehicles traveling ahead which reside within the image sensing area thereof and detects a distance (an inter-vehicle distance) between in particular, a preceding vehicle so recognized and the subject vehicle. In addition, when a detection signal based on information on the preceding vehicle so detected is provided to the lighting control means ECU, the lighting control means ECU is caused to switch lighting states of the headlamps RHL, LHL, that is, between low beams and high beams based on the detection signal and, furthermore, is caused to control a lighting state when the headlamps are switched to the high beams and a putting-out (i.e., turning off) state when the headlamps are switched to the low beams. In addition, this preceding vehicle detection means FMD may be use an extremely high frequency radar, provided that an inter-vehicle distance between the subject vehicle and the preceding vehicle can be detected.

When the lamp switch LSW is switched on, the lighting control means ECU supplies electric power to the headlamps RHL, LHL to illuminate them. As this occurs, depending upon how the beam switch BSW is switched, the lighting control means ECU controls the lighting or putting out of low beam lamps RLBL, LLBL and high beam lamps RHBL, LHBL of the headlamps RHL, LHL. Namely, when the beam switch BSW is switched to the low beam, only the low beam lamps RLBL, LLBL are lit, whereas when the beam switch BSW is switched to the high beam, the low beam lamps RLBL, LLBL and the high beam lamps RHBL, LHBL are lit simultaneously. In addition, the lighting control means ECU is also caused to control the lighting or putting out of the low beam lamps RLBL, LLBL and the high beam lamps RHBL, LHBL based on the detection signal from the preceding vehicle detection means FMD. Furthermore, when controlling the lighting or putting out of the high beam lamps RHBL, LHBL, the lighting control means ECU is also caused to control independently lighting timings at which electric power is supplied to the H1 light source 141 and the H2 light source 142 of the high beam lamps RHBL, LHBL and putting out timings at which the supply of electric power to the same light sources of the same lamps is cut off. For example, the lighting control means ECU is caused to implement and interrupt the supply of electric power for a predetermined period of time, whereby the illuminations by the H1 light source and the H2 light source 142 are caused to get brighter or darker gradually.

Figure 4:
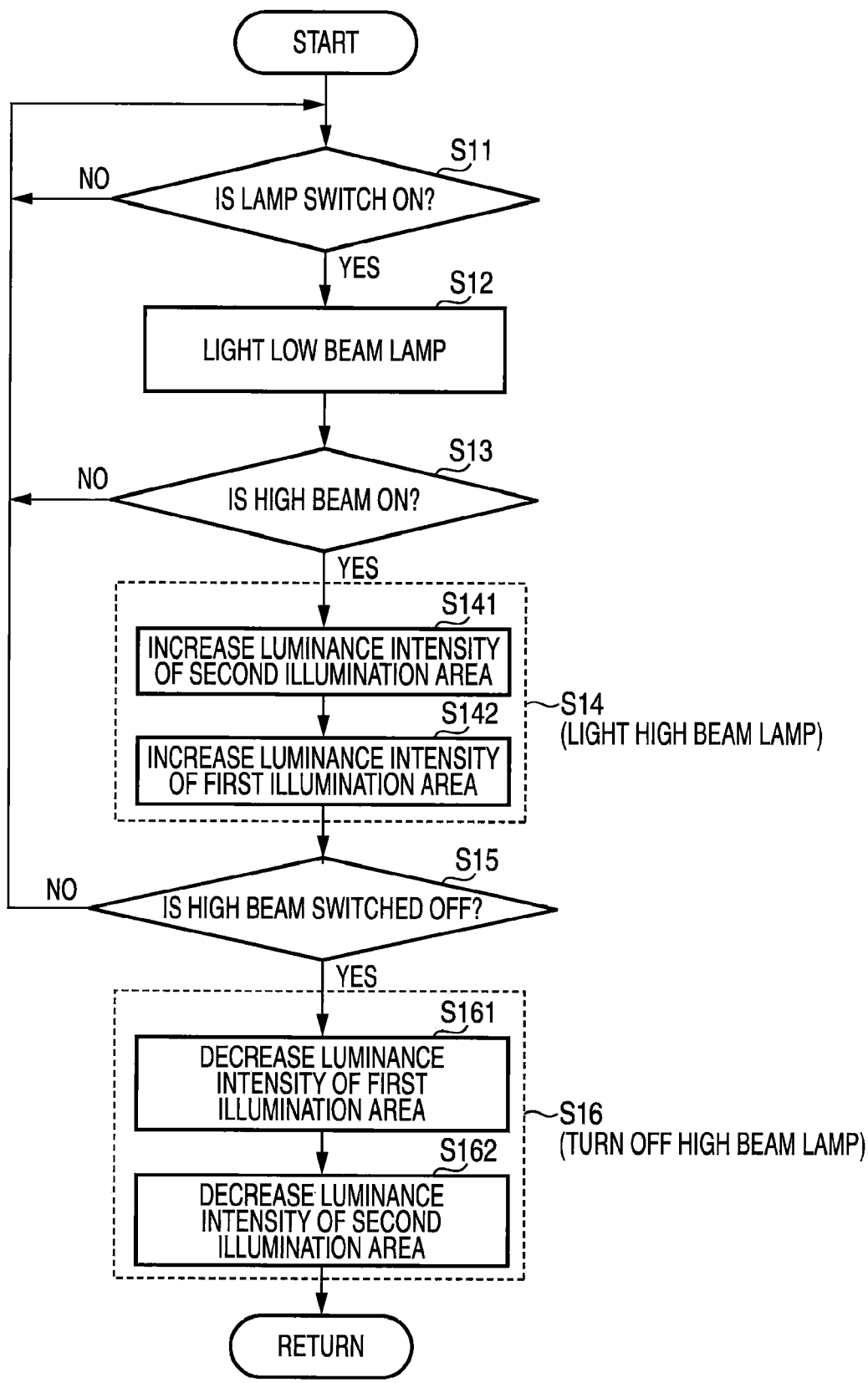
FIG. 4 is a flowchart illustrating a beam switching operation.

According to the foregoing configuration, as is shown in the flowchart of FIG. 4, when the driver switches on the lamp switch LSW (S11), the lighting control means ECU lights only the low beam lamps RLBL, LLBL (S12). This results in an illumination based on the light distribution pattern LBP shown in FIG. 5(a), whereby a near-field area direct in front of the subject vehicle is illuminated. On the other hand, when the driver operates the beam switch BSW so that the headlamps are switched to the high beams (S13), the lighting control means ECU lights the high beam lamps RHBL, LHBL in addition to the low beam lamps RLBL, LLBL (S14). The lighting control means ECU illuminates the H1 light source 141 and the H2 light source 142, so that, as is shown in FIG. 5(c), the light distribution pattern HBP1 by the H1 light source 141 which illuminates the first illumination area SA1 and the light distribution pattern HBP2 by the H2 light source 142 which illuminates the second illumination area SA2 are superposed on the light distribution pattern by the low beam lamps RLBL, LLBL, this resulting in a high beam light distribution pattern. In addition, when the driver switches off the beam switch BSW so that the headlamps are switched to the low beams (S15), the lighting control means ECU puts out only the high beam lamps RHBL, LHBL (S16) so as to restore the light distribution pattern shown in FIG. 5(a).

Here, in step S14 where the headlamps are switched from the low beams to the high beams, although the lighting control means ECU lights the R filaments 141 and the F filaments 142 of the high beam lamps, that is, the H1 light sources 141 and the H2 light sources 142, as this occurs, the lighting control means ECU controls the lighting states of both the light sources independently. Namely, the lighting control means ECU firstly lights only the H2 light sources 142 so as to increase the luminance intensity of the second illumination area SA2 (S141) and lights the H1 light sources 141 a certain period of time after the H2 light sources have been so lit so as to increase the luminance intensity of the first illumination area SA1 (S142), so that the first illumination area SA1 and the second illumination area SA2 are caused to be eventually lit with predetermined luminance intensities. In addition, in step S16, when the beam switch BSW is switched off from the high beam light distribution so that the headlamps are switched back to the low beams, although the lighting control means ECU turns off the high beam lamps so that the headlamps are switched to the light distribution realized by the low beams only, as this occurs, the lighting control means ECU firstly turns off only the H1 light sources 141 so as to decrease the luminance intensity of the first illumination area SA1 (S161) and turns off the H2 light sources a certain period of time after the H1 light sources have been turned off so as to decrease the luminance intensity of the second illumination area SA2 (S162), so that the first illumination area SA1 and the second illumination area SA2 are caused to be finally turned off.

In this way, when the headlamps are switched from the low beams to the high beams, since the luminance intensity of the second illumination area SA2 is firstly increased, as is shown in FIG. 5(b), a light distribution pattern results which is made up of the light distribution pattern LBP of the low beams and the light distribution HBP2 of the second illumination area. When the headlamps are switched to this light distribution pattern, a peripheral area of the front of the subject vehicle first becomes bright. Following this, a light distribution pattern results, as is shown in FIG. 5(c), on which the light distribution pattern HBP1 of the first illumination area SA1 is superposed by increasing the luminance intensity of the first illumination area SA1. The area lying ahead of and square to the subject vehicle then gets brighter, finally resulting in the light distribution by the high beam. Because of this, there occurs no situation in which the forward area of the subject vehicle gets bright abruptly when the headlamps are switched to the high beams, and hence, the driver does not feel a sensation of physical disorder. In addition, as the forward area lying ahead of the subject vehicle is illuminated brightly in a sequential fashion from the peripheral area to the front area, should the driver fail to recognize other vehicles such as oncoming vehicles and/or preceding vehicles, the driver can still recognize such other vehicles in the midst of the forward area being so illuminated. Thus, as this occurs, switching to the high beams can be stopped promptly, thereby making it possible to prevent the dazzling of other such vehicles.

On the other hand, when the headlamps are switched from the high beams to the low beams, the luminance intensity of only the first illumination area SA1 is decreased first from the light distribution of high beams shown in FIG. 5(c) to the light distribution shown in FIG. 5(b), and a certain period of time after the reduction in luminance intensity of the first illumination area SA1, the luminance intensity of the second illumination area SA2 is decreased, so that both the first illumination area SA1 and the second illumination area SA2 are finally turned off, whereby the light distribution pattern by the low beams shown in FIG. 5(a) results. Because of this, in the light distribution pattern shown in FIG. 5(b) which results in the midst of the light distribution patterns being changed from FIG. 5(c) to FIG. 5(a), the bright illumination in the peripheral area can be ensured even when the illumination of the front area lying ahead of the subject vehicle is reduced. As the illumination of the peripheral area is reduced thereafter, occurrence of a situation in which the forward or peripheral area of the subject vehicle becomes dark abruptly can be prevented, whereby the driver is made to feel uneasy to produce an unsafe driving condition. In addition, there occurs no situation in which the driver is made to feel the sensation of physical disorder.

Embodiment 2

Figure 5:
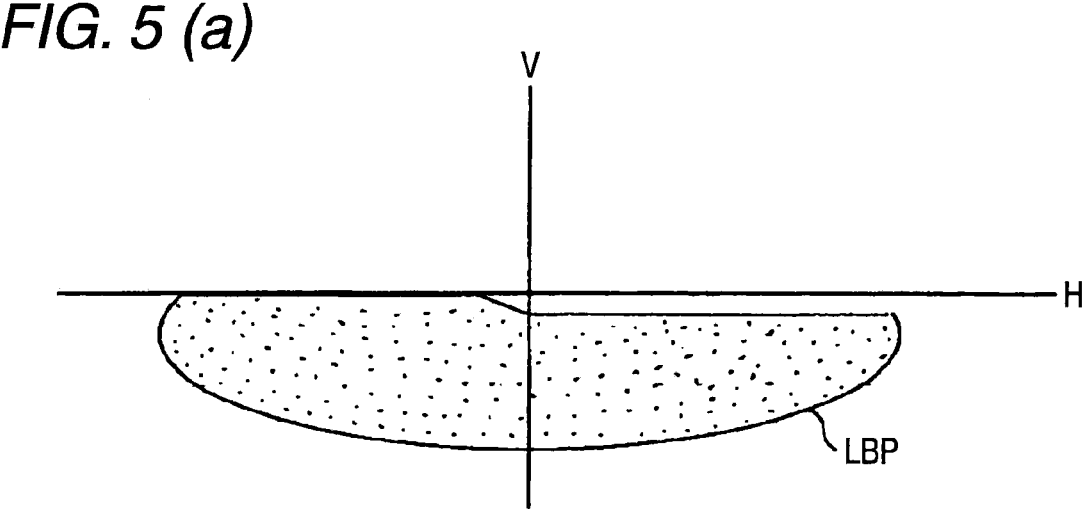
FIG. 5 is a diagram showing a light distribution pattern resulting when beams are switched according to Embodiment 1.
Figure 5:
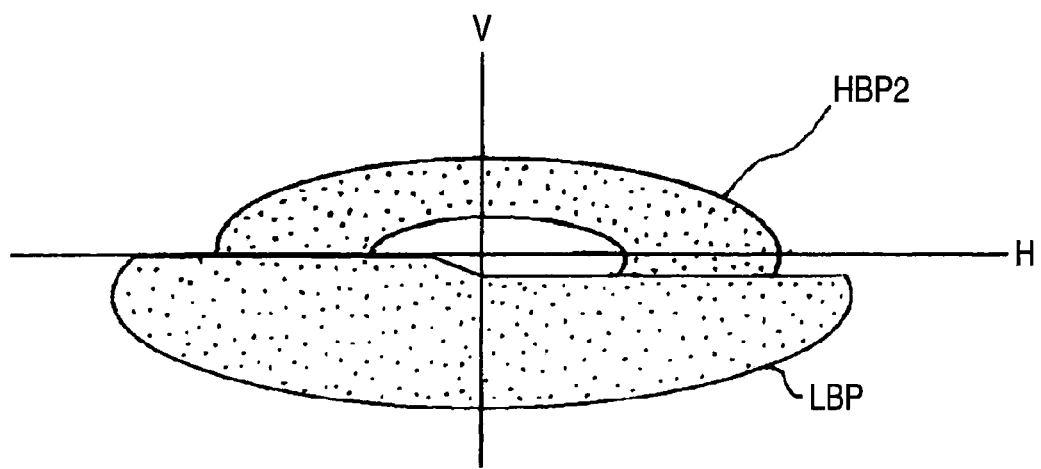
Figure 5:
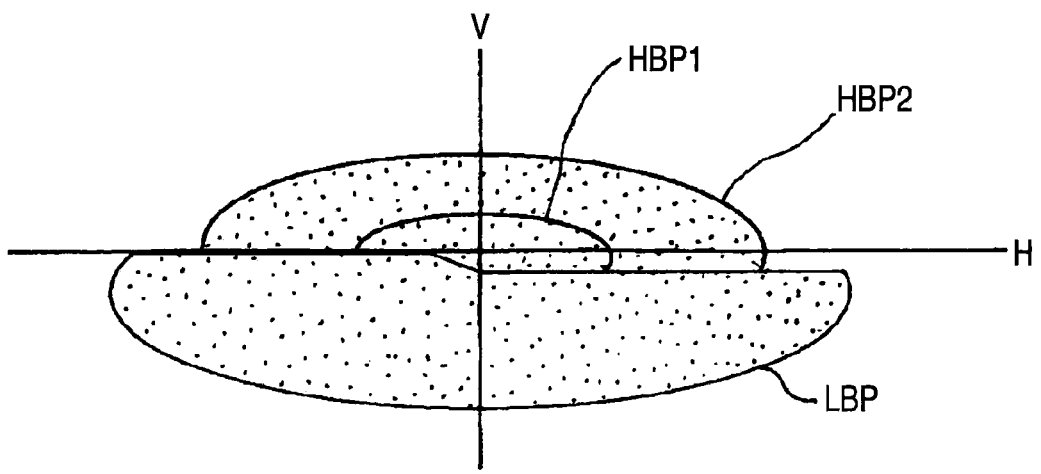
Figure 6:
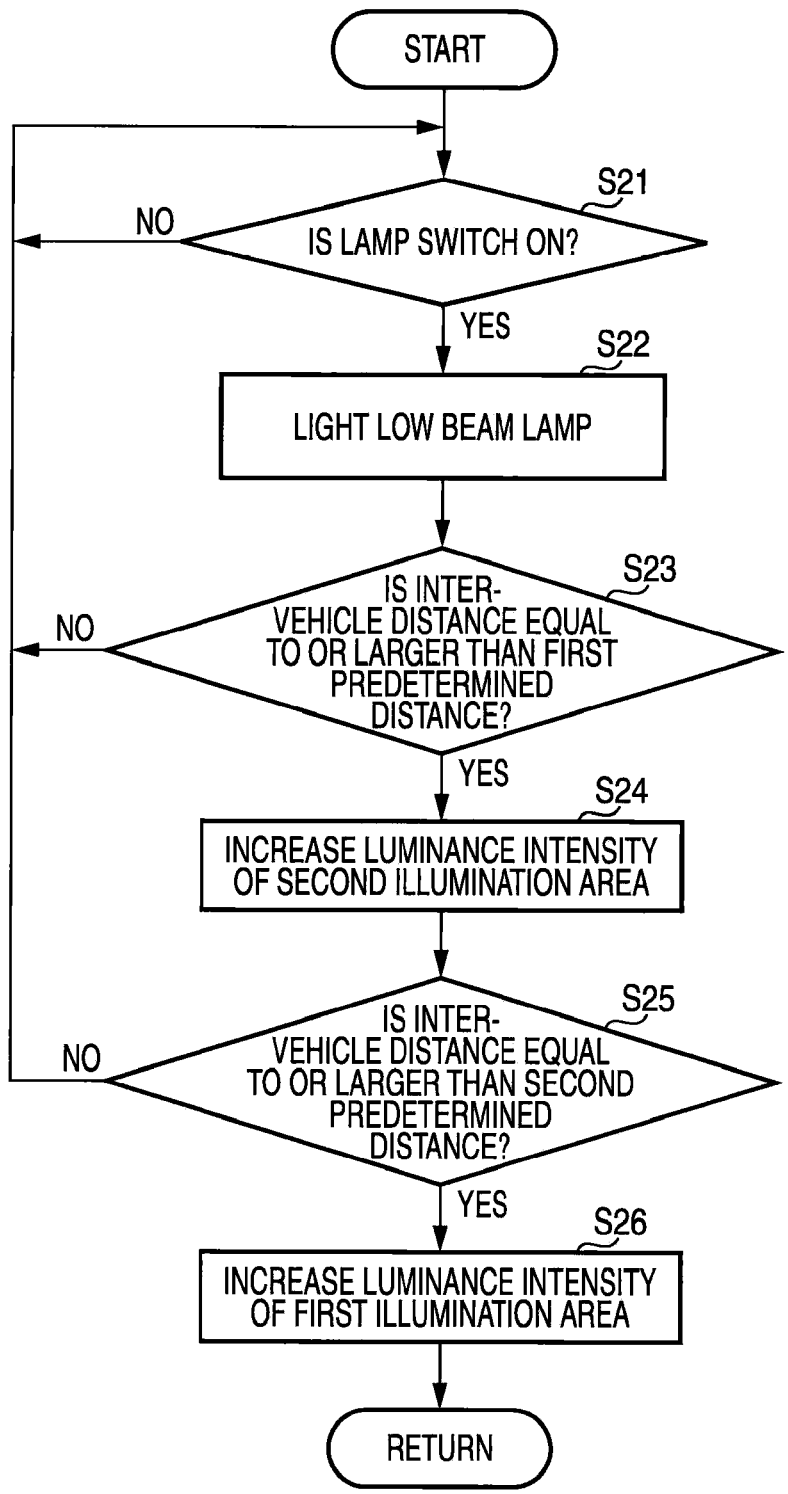
FIG. 6 is a flowchart illustrating a beam switching operation of Embodiment 2.

In Embodiment 1, the headlamps are switched between the high beams and the low beams by the beam switch BSW which is operated by the driver. In Embodiment 2, headlamps are switched between high beams and low beams based on a detection output of a preceding vehicle detection unit FMD. As shown in the flowchart of FIG. 6, when a lamp switch LSW is switched on (S21), low beam lamps RLBL, LLBL are lit (S22). In this state, the preceding vehicle detection unit FMD detects, for example, a preceding vehicle and detects an inter-vehicle distance between the subject vehicle and the preceding vehicle so detected. When the inter-vehicle distance so detected is shorter than a first predetermined distance, a lighting control means ECU lights only the low beam lamps but does not light high beam lamps. Thus, an illumination results based on the light distribution pattern LBP by the low beams shown in FIG. 5(a). When the inter-vehicle distance becomes equal to or larger than the first predetermined distance (S23), the lighting control means ECU lights only H2 light sources 142 of the high beam lamps RHBL, LHBL, so as to increase the luminance intensity of a second illumination area SA2 (S24). This results in an illumination based on the light distribution pattern by the high beams shown in FIG. 5(b) which is made up of the light distribution patterns LBP+HPB2. A near-field area direct in front of the subject vehicle and a peripheral area are illuminated brightly to enhance the forward visibility ahead of the subject vehicle without dazzling the preceding vehicle, thereby making it possible to ensure safe driving of the subject vehicle.

In addition, in this embodiment, when the inter-vehicle distance becomes equal to or larger than a second predetermined distance larger than the first predetermined distance (S25), the lighting control means ECU continues to light H1 light sources 141, so as to increase the luminance intensity of a first illumination area SA1 (S26). This results in an illumination based on the light distribution pattern by the high beams shown in FIG. 5(c) which is made up of the light distribution patterns LBP+HBP1+HPB2, so as to enhance the visibility in a far-field area and the peripheral area both lying ahead of the subject vehicle, while preventing the dazzling of the preceding vehicle which has now moved far away ahead of the subject vehicle, thereby making it possible to ensure safe driving.

In addition, in Embodiment 2, when the inter-vehicle distance to the preceding vehicle becomes shorter than the second predetermined distance again, the lighting control means ECU puts out the H1 light sources 141 first, and furthermore, when the inter-vehicle distance becomes shorter than the first predetermined distance, the lighting control means ECU then puts out the H2 light sources, as well, so that the high beam lamps are put out, whereby the headlamps are switched back to the illumination by the low beams. Thus, a risk that the forward area of the subject vehicle gets dark abruptly is eliminated, while preventing the dazzling of the preceding vehicle to which the subject vehicle is getting nearer, whereby the visibility in the forward area lying ahead of the subject vehicle is enhanced, thereby making it possible to ensure safe driving.

Embodiment 3

Figure 7:
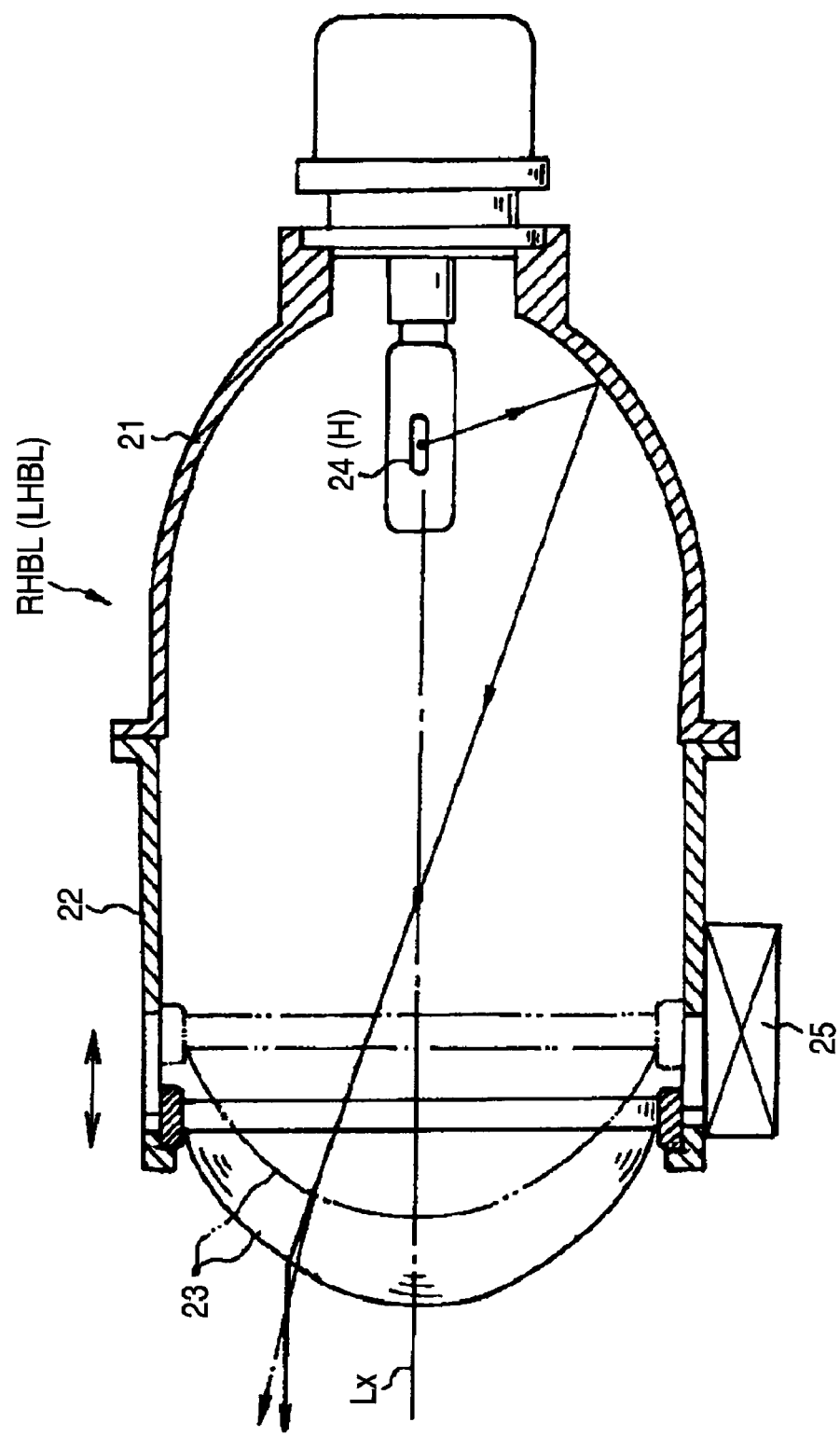
FIG. 7 is a sectional view showing a schematic configuration of a headlamp of Embodiment 3.

FIG. 7 is a conceptual block diagram of a high beam lamp RHBL (LHBL) according to a third embodiment (Embodiment 3). This lamp operates as a projector lamp and is made up of a substantially ellipsoidal reflector 21, a cylindrical holder 22 attached to a front opening of the reflector 21, and a collective lens 23 in a front opening of the holder 22. A single H light source 24 is in an interior of the reflector 21, and the H light source 24 is made up of a bulb (an electric bulb) which is disposed at a first focal point of the reflector 21. The collective lens 23 is formed as a convex lens and can be adjusted in position within a predetermined length range in a longitudinal direction along a lamp optical axis Lx by a slide mechanism 25 provided on the holder 22 as indicated by arrows in FIG. 7. The slide mechanism 25 is controlled by a lighting control means ECU as shown in FIG. 1, so as to enable a position adjustment of the collective lens 23 in association with lighting or putting out control of the H light source 24.

Figure 8:
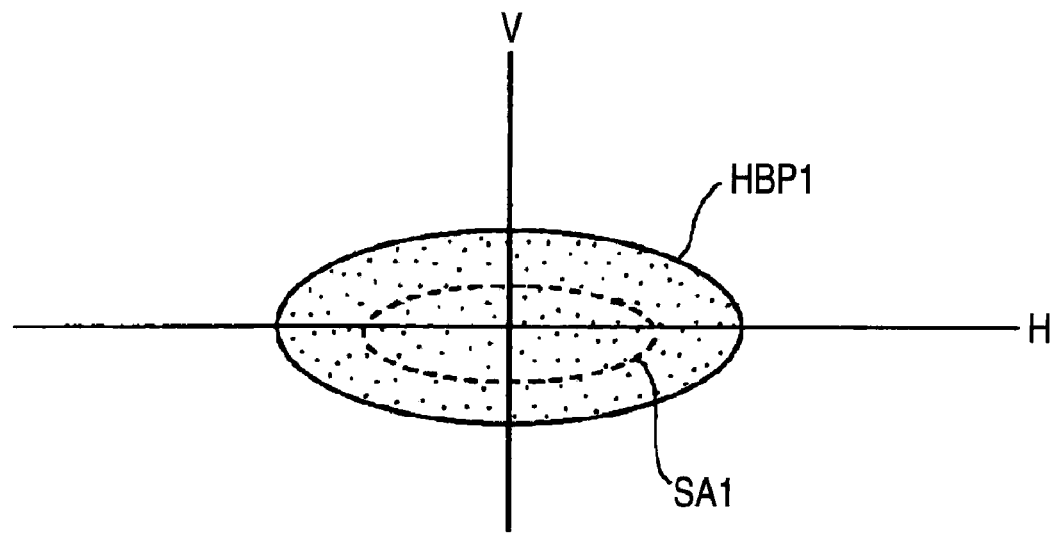
FIG. 8 shows a light distribution pattern diagram resulting when beams are switched according to Embodiment 3.
Figure 8:
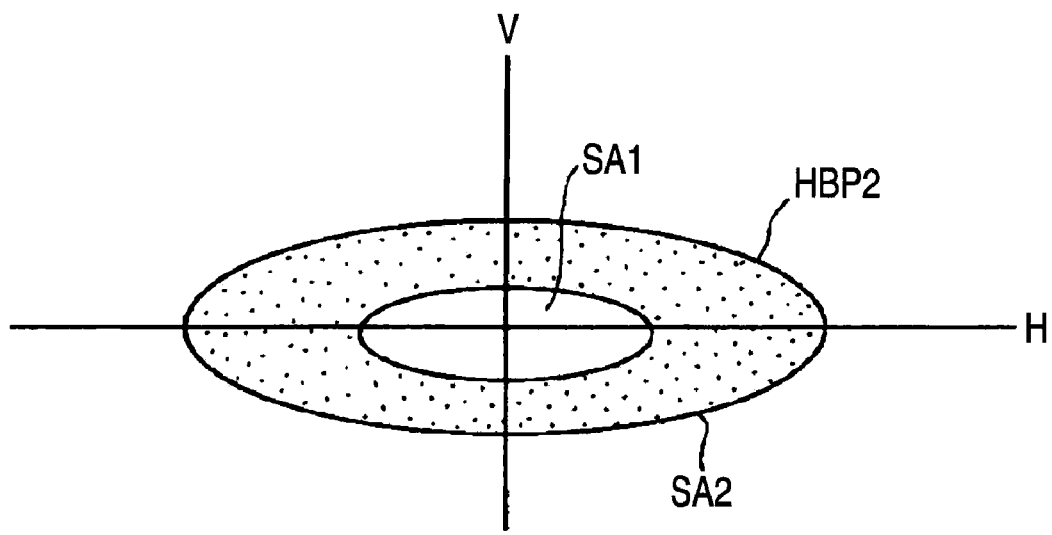

In this high beam lamp RHBL (or LHBL), when the collective lens 23 is adjusted to a normal position indicated by a solid line in FIG. 7, as a rear focal point of the collective lens 23 substantially coincides with a second focal point of the reflector 21, light emitted from the H light source 24 and reflected on the reflector 21 is emitted as a bundle of light which is substantially parallel to the lamp optical axis Lx by the collective lens 23. This results, as is shown in FIG. 8(*a*), in a light distribution pattern HBP1 which illuminates an area slightly wider than a first illumination area SA1 which constitutes a horizontally central illumination area lying ahead of and square to the subject vehicle. When the collective lens 23 is adjusted from the normal position to a position indicated by a chain line in FIG. 7 which lies rearwards along the optical axis direction, the rear focal point of the collective lens 23 comes to lie further rearwards than the second focal point of the reflector 21, and light emitted from the H light source 24 and reflected on the reflector 21 is emitted as a bundle of light which diverges by the collective lens 23. This results, as is shown in FIG. 8(*b*), in a light distribution pattern HBP2 which illuminates a second illumination area SA2 constituting an annular area which lies horizontally further leftwards and right wards and vertically further upwards and downwards than the first illumination area SA1.

In a headlamp fitted with this high beam lamp RHBL (or LHBL), when the headlamp is switched from the low beam to the high beam, the high beam lamp RHBL (LHBL) starts to become lit, while the collective lens 23 is adjusted from the rear position towards the front normal position. By these actions, the light distribution of the high beam results in the light distribution pattern of the second illumination area SA2 which is similar to the light distribution pattern shown in FIG. 5(*b*). As the collective lens 23 is shifted forwards, the illumination area converges toward the center, and the luminance intensity of the second illumination area SA2 decreases, whereas the luminance intensity of the first illumination area SA1 increases gradually, finally resulting in a light distribution pattern similar to the light distribution pattern shown in FIG. 5(*c*), in which the luminance intensity of the first illumination area SA1 becomes high and the luminance intensity of the second illumination area SA2 becomes lower than the luminance intensity of the first illumination area SA1. Thus, the peripheral area to the front of the subject vehicle gets brighter gradually, and following this, the area lying ahead of and square to the subject vehicle then gets brighter gradually, finally resulting in the light distribution by the high beam. Because of this there occurs no situation in which the forward area of the subject vehicle gets bright abruptly, whereby the driver is prevented in any case from feeling the sensation of physical disorder. In addition, since the peripheral area gets bright gradually, should the driver fail to recognize an oncoming vehicle and/or a preceding vehicle, the driver can recognize them while the peripheral area is made bright. Shifting to the high beam can be stopped promptly when the driver recognizes them, and dazzling of other such vehicles can be prevented.

On the other hand, when the headlamp is switched from the high beam to the low beam, the collective lens 23 is adjusted gradually from the normal position towards the rear. By this action, the light distribution patterns are changed from the state shown in FIG. 5(*c*) to the state shown in FIG. 5(*b*), that is, the quantity of light in the first illumination area SA1 is reduced gradually, and thereafter, the luminance intensity of the second illumination area SA2 is also reduced gradually, finally resulting in an illumination by the low beam lamp as shown in FIG. 5(*a*) in which the first illumination area and the second illumination area are both unilluminated. Because of this, the bright illumination in the peripheral area can be ensured even when the illumination of the front area lying ahead of the subject vehicle is reduced, and since the illumination of the peripheral area is reduced thereafter, occurrence of a situation in which the forward or peripheral area of the subject vehicle becomes dark abruptly can be prevented. This can reduce occurrence of situations in which the driver is made to feel uneasy resulting in unsafe driving. In addition, there occurs no situation in which the driver is made to feel the sensation of physical disorder.

Embodiment 4

Figure 9:
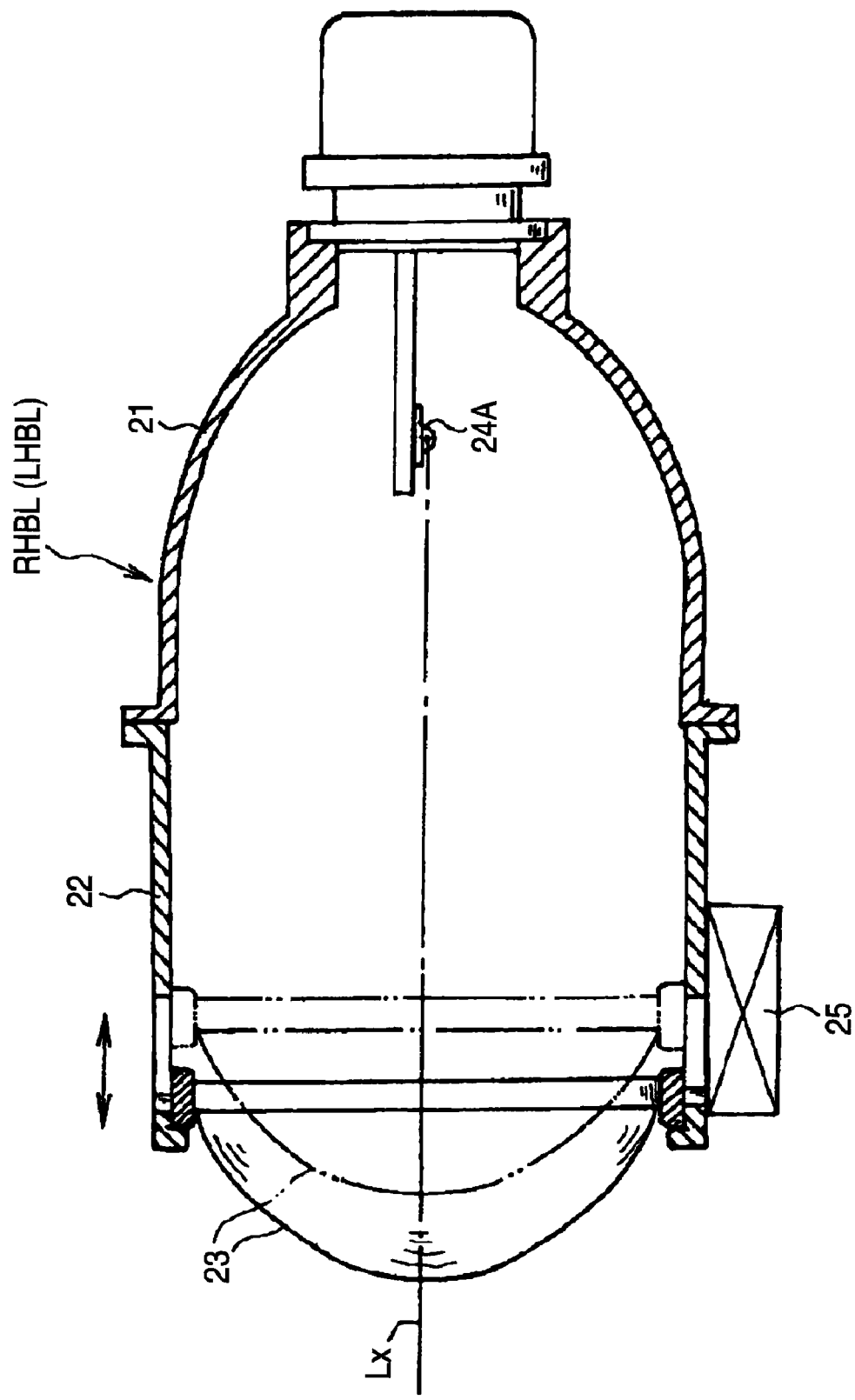
FIG. 9 is a sectional view showing a schematic configuration of a headlamp of Embodiment 4.

FIG. 9 is a conceptual block diagram showing a high beam lamp RHBL (LHBL) of a fourth embodiment (Embodiment 4), which is a modified example of Embodiment 3. Embodiment 4 is characterized by use of a light emitting device such as an LED as an H light source 24, which has directivity in emitting light. By providing the LED on a reflector 21 so that light is emitted downwards from the LED, light emerging from a collective lens 23 illuminates an area lying further upwards than a horizontal line H. Consequently, in this high beam lamp, by adjusting the position of the collective lens 23 longitudinally along a lamp optical axis Lx, a light distribution pattern is obtained which illuminates a first illumination area SA1 which constitutes a horizontally central illumination area lying ahead of and square to the subject vehicle, as shown in FIG. 8(*a*) and an area of an annular pattern HBP2 as shown in FIG. 8(*b*) which lies substantially further upwards than a horizontal line H, that is, an upper half portion of a second illumination area SA2, which constitutes a semi-annular area and which lies horizontally further leftwards and right wards and vertically further upwards than the first illumination area SA1.

In Embodiment 4, in switching the headlamp from the low beam to the high beam, when the collective lens 23 is adjusted gradually from a rear position toward a front normal position after the high beam lamp RHBL (LHBL) begins to be lit, the resulting light distribution of the high beam lamp becomes only a semi-circular portion of the second illumination area SA2 which constitutes a portion of the light distribution shown in FIG. 8(*b*) and which lies further upwards than the horizontal line H. The luminance intensity of the first illumination area, whose illumination area converges toward the center as the collective lens 23 shifts forward, gradually increases, finally resulting in a light distribution in which the luminance intensity of the first illumination area SA1 becomes high and the luminance intensity of the second illumination area SA2 is lower than the luminance intensity of the first illumination area SA1. In addition, when the headlamp is switched from the high beam to the low beam, the collective lens 23 is gradually adjusted to the rear from the normal position. By this action, the quantity of light in the first illumination area SA1 is first reduced gradually, and thereafter, the luminance intensity of the second illumination area SA2 is also reduced gradually, finally resulting in the illumination by the low beam lamp with the first illumination area and the second illumination area both unilluminated. Consequently, the headlamp can be switched to the same light distribution pattern as that shown in FIG. 5.

In Embodiment 4, either when the headlamp is switched from the high beam to the low beam or when the headlamp is switched from the low beam to the high beam, the light distribution does not change abruptly, and the luminance intensity in the front area lying ahead of the subject vehicle can be decreased or increased after the illumination of the periphery of the subject vehicle has been ensured. Therefore, safe driving of the subject vehicle can be ensured without causing the driver to feel the sensation of physical disorder. In addition, in Embodiment 4, the light emitting device such as the LED is used as the H light source 24. As the quantity of light emitted can be controlled easily in a continuous fashion, the luminance intensity can be changed gradually with time when changing the luminance intensities of the first illumination area and the second illumination area, whereby the sensation of physical disorder that is felt by the driver can be suppressed more effectively.

Embodiment 5

Figure 10:
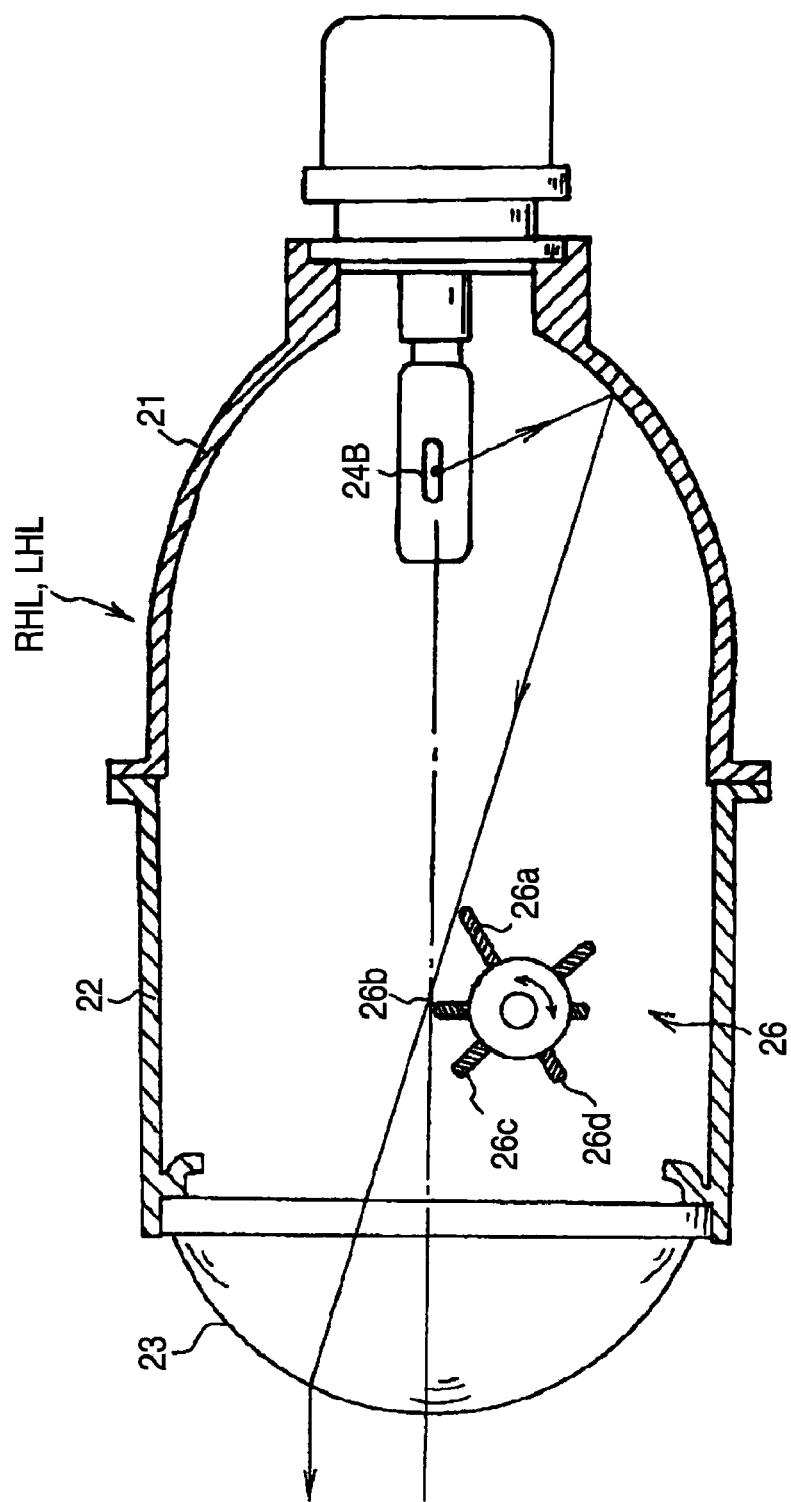
FIG. 10 is a sectional view showing a schematic configuration of a headlamp of Embodiment 5.

FIG. 10 is a conceptual block diagram of a headlamp of Embodiment 5. Embodiment 5 shows an example of a two headlamp system in which respective light distributions of a high beam and a low beam are switched by a single lamp in each of left and right headlamps. Each of the headlamps RHL, LHL is configured as a projector lamp and is made of an ellipsoidal reflector 21, a holder 22 attached to a front opening of the reflector 21, a collective lens 23 fixedly provided in a front opening of the holder 22, an HL light source 24B such as a halogen bulb disposed in a first focal point position of the reflector 21, and a rotary shade 26 disposed in a position which lies in a front position of the HL light source 24B and in the vicinity of a second focal point of the reflector 21. The rotary shade 26 is configured so that its rotary position can be adjusted by a lighting control means ECU as shown in FIG. 1. The rotary shade 26 includes a plurality of shades and, in particular, includes four shades 26*a* to 26*d* provide in a radial fashion in this embodiment. The respective shades 26*a* to 26*d* are different in shape and disposed in different rotary positions. Thus, by adjusting the rotary position of the rotary shade 26, an arbitrary shade can be disposed in a position along a lamp optical axis Lx.

Figure 11:
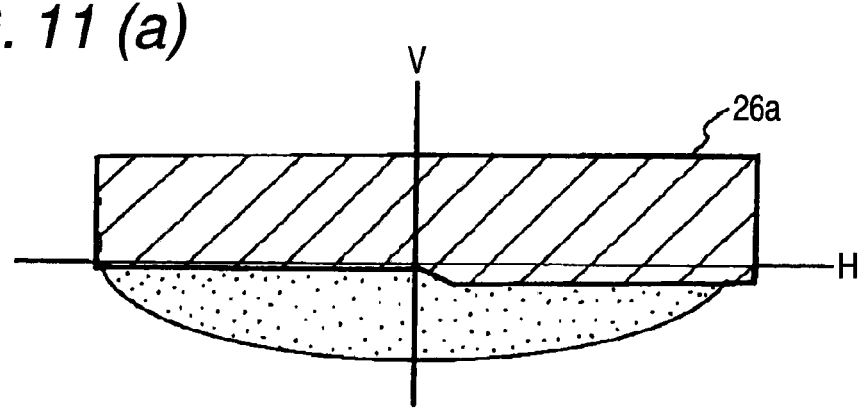
FIG. 11 shows a light distribution pattern diagram resulting when beams are switched according to Embodiment 5.
Figure 11:
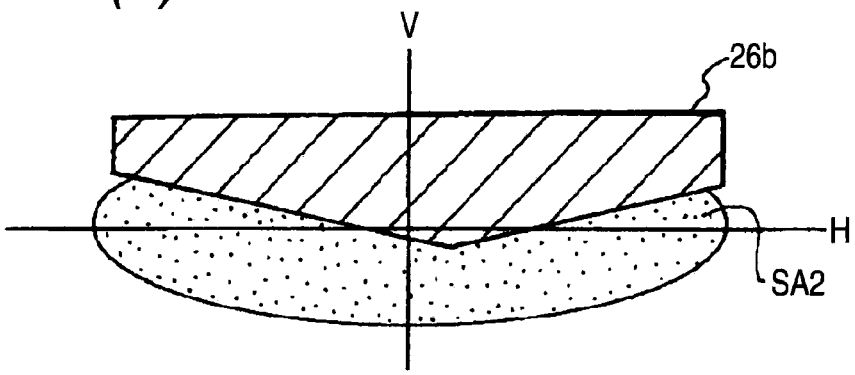
Figure 11:
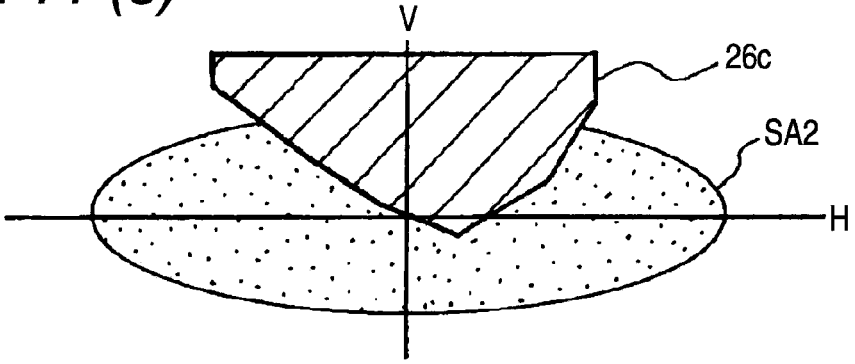
Figure 11:
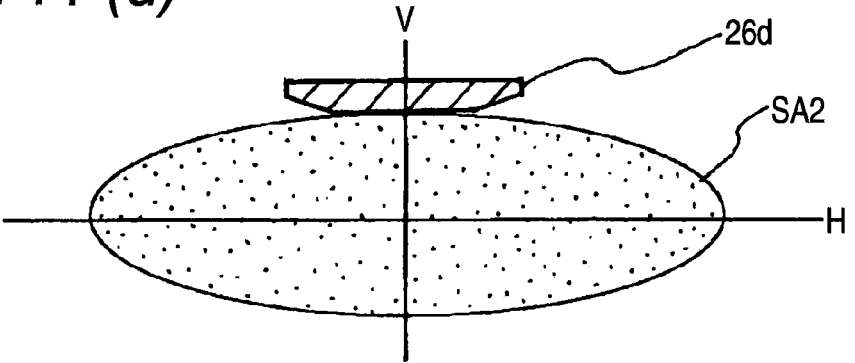

When the rotary position of the shade 26 is adjusted, for example, the shade 26*a* is adjusted so as to be positioned oriented towards the lamp optical axis Lx, an upper half area of light emitted from the HL light source 24B and reflected on the reflector 21 is cut off or interrupted by the shade 26*a*, and hence, as is shown in FIG. 11(*a*), an area lying further upwards than a horizontal line H of a light distribution pattern that would otherwise be formed is shielded and an area which lies further downwards than the horizontal line H is illuminated, whereby a light distribution pattern of the low beam results which has a required cut-off line. When the shade 26*b* is adjusted to be positioned as described above, the light distribution pattern shown in FIG. 11(*b*) is formed which illuminates an area lying further downwards than the horizontal line H and left and right small peripheral areas, that is, part of a second illumination area SA2. When the shade 26*c* is adjusted to be positioned as described above, a light distribution pattern shown in FIG. 11(*c*) is formed which illuminates an area lying further downwards than the horizontal line H and left and right relatively wide peripheral areas, that is, a second illumination area SA2. When the shade 26*d* is adjusted to be positioned as described above, a light distribution pattern shown in FIG. 11(*d*) is formed which illuminates an area expanding from the front to peripheral areas of the subject vehicle, that is, a first illumination area SA1 and a second illumination area SA2 entirely.

In Embodiment 5, in the low beam, by selecting the shade 26*a*, the light distribution pattern is formed to illuminate the area below the horizontal line H, that is, the light distribution pattern of the low beam. When the headlamp is switched from the low beam to the high beam, by controlling the rotary position of the shade 26 so that the shades 26*b*, 26*c*, 26*d* are selected in this order so as to be oriented towards the lamp axis Lx, as the light distribution pattern formed changes in the order of FIGS. 11(*b*), 11(*b*), 11(*d*), the illuminations of the left and right peripheral areas of the second illumination area SA2 are initially added, and the shielded range is gradually narrowed towards a central area, resulting in a light distribution of the high beam which illuminates the first illumination area SA1. In addition, when the headlamp is switched from the high beam to the low beam, by changing the rotary position of the shade 26 in an opposite order, the first illumination area starts to be shielded, thereafter, the shielded area is expanding laterally, and finally, the second illumination area is also shielded, whereby the light distribution of the low beam is formed.

In this way, in Embodiment 5, as well, either when the headlamp shifts from the high beam to the low beam or when the headlamp shifts from the low beam to the high beam, the light distribution does not changes abruptly, and the luminance intensity in the front area lying ahead of the subject vehicle can be decreased or increased after the illumination of the periphery of the subject vehicle has been ensured. Therefore, safe driving of the subject vehicle can be ensured without causing the driver to feel the sensation of physical disorder.

Embodiment 6

FIG. 11 is a conceptual block diagram of a headlamp of a sixth embodiment (Embodiment 6). Embodiment 6 shows, as with Embodiment 5, an example of a two-headlamp system in which respective light distributions of a high beam and a low beam are switched by a single lamp in each of left and right headlamps. In this embodiment, each of the headlamps RHL, LHL is configured as a projector lamp as in Embodiments 2 to 5 and includes a variable shade 27 in a front opening position of an ellipsoidal reflector 21. This variable shade 27 is designed so that a light shielding pattern can be changed arbitrarily and includes, for example, a light transmissive LCD (liquid crystal) device in which multiple minute pixels are arranged in a matrix shape, whereby a pattern of a non-light transmissive portion, that is a light shielding pattern, is controlled so as to be changed to an arbitrary pattern through a pattern control by an LCD drive means 28 which is controlled by a lighting control means ECU.

Figure 13:
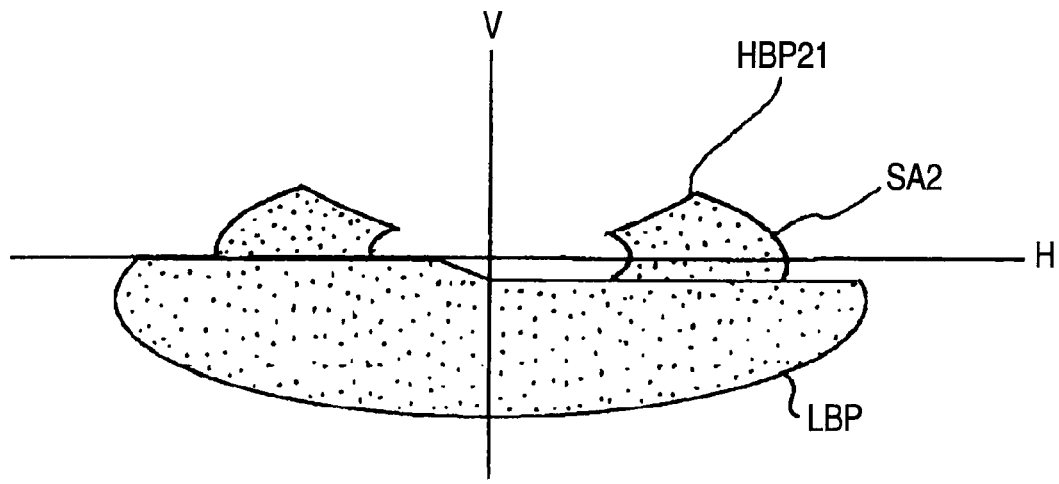
FIG. 13 shows a light distribution pattern diagram resulting when beams are switched according to Embodiment 6.
Figure 13:
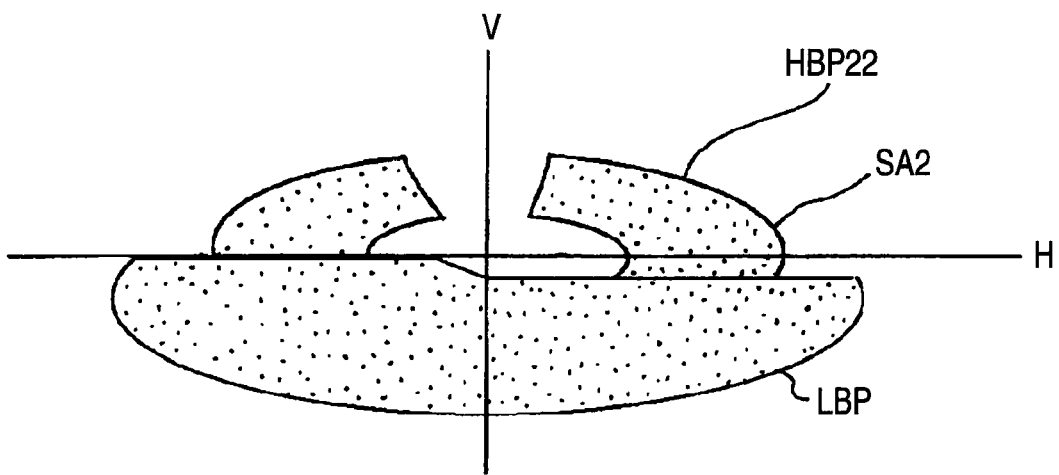
Figure 13:
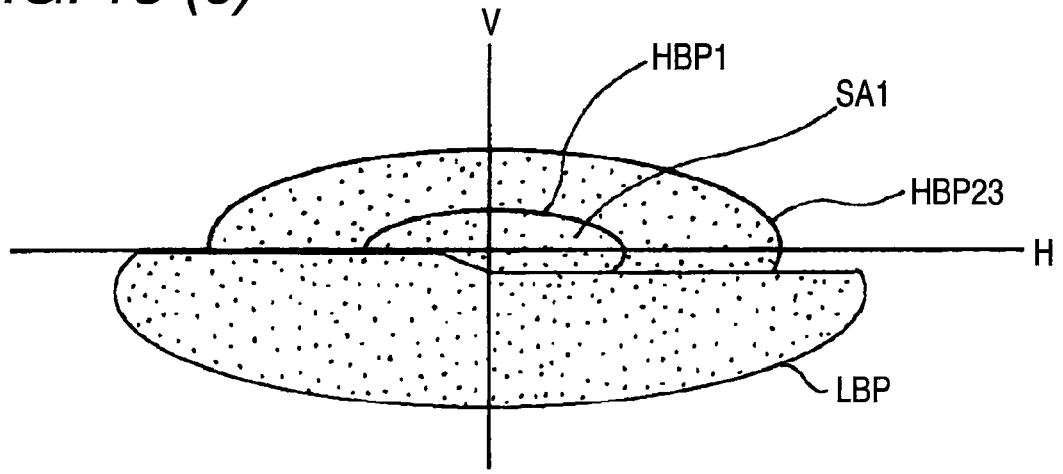

By changing the light shielding pattern of the variable shade 27, for example, as is shown in FIG. 13(*a*), since part of light emitted from an HL light source 24B and reflected on a reflector 21 is shielded by the variable shade 27, a light distribution pattern is formed which has a light distribution pattern LBP of the low beam which illuminates an area lying below a horizontal line H and a light distribution pattern HBP21 which illuminates part of a second illumination area SA2 which is made up of left and right small peripheral areas thereof. In addition, as is shown in FIG. 13(*b*), a light distribution pattern LBP22 can be formed in which illumination areas at left and right peripheral areas of a second illumination area SA2 are expanded. Furthermore, as is shown in FIG. 13(*c*), a light distribution pattern of the high beam can be formed which is almost free from the light shielding effect of the variable shade 27 and which includes light distribution patterns HBP1 and HBP23 that illuminate an entire area expanding from a first illumination area SA1, which lies directly ahead of the subject vehicle, to a second illumination area SA2, which surrounds the periphery of the first illumination area SA1.

In Embodiment 6, by controlling the variable shade 27, in the low beam, the headlamp is set to the light distribution pattern of FIG. 13(a) which illuminates mainly the area below the horizontal line H, while in the high beam, the headlamp is set to the light distribution pattern of FIG. 13(c) which illuminates the area lying ahead of and square to the subject vehicle. When the headlamp is switched from the low beam to the high beam, by controlling the light shielding pattern of the variable shade 27 so as to narrow the light shielding area gradually, the headlamp is set to the light distribution pattern of FIG. 13(b) in which only the first illumination area SA1 is shielded so that the second illumination area SA2 is illuminated, and thereafter, the first illumination area SA1 starts to become illuminated gradually, finally resulting in the light distribution pattern of the high beam. In addition, when the headlamp is switched from the high beam to the low beam, by changing the light shielding pattern of the variable shade 27 in the opposite order, the headlamp is set to the light distribution of the high beam in which the first illumination area SA1 begins to be shielded, thereafter the light shielding area is expanded upwards and laterally, and finally the second illumination area SA2 is shielded, thus resulting in the light distribution pattern of the low beam.

In this way, in Embodiment 6, either when the headlamp shifts from the high beam to the low beam or when the headlamp shifts from the low beam to the high beam, the light distribution does not change abruptly, and the luminance intensity in the front area lying ahead of the subject vehicle can be decreased or increased after the illumination of the periphery of the subject vehicle has been ensured. Therefore, safe driving of the subject vehicle can be ensured without causing the driver to feel the sensation of physical disorder.

Figure 14:
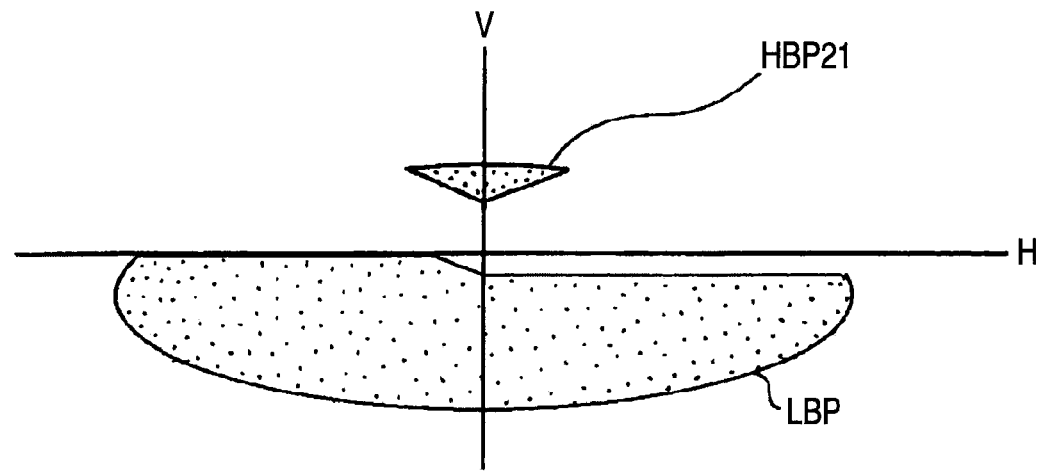
FIG. 14 shows a light distribution pattern diagram resulting when beams are switched according to a modified example to Embodiment 6.
Figure 14:
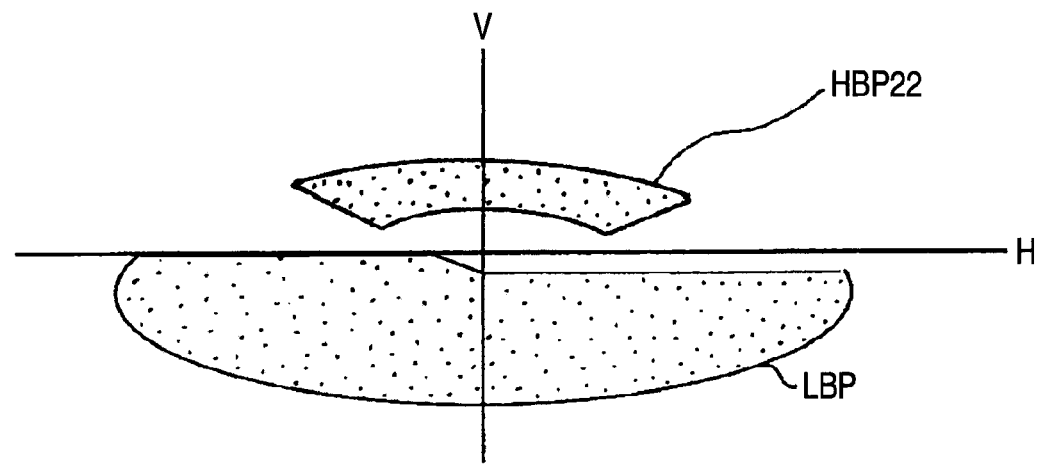
Figure 14:
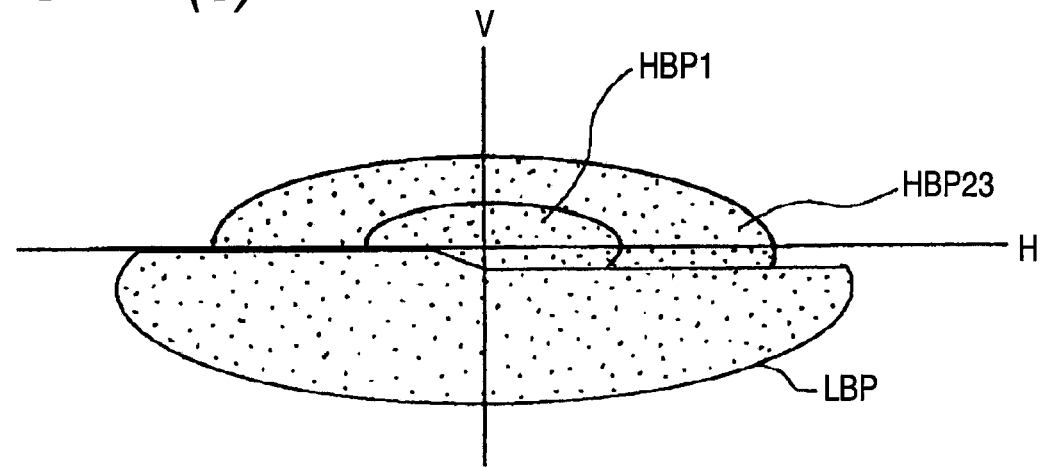

In Embodiment 6, since the light shielding pattern of the variable shade 27 can be set arbitrarily, for example, as is shown in FIGS. 14(a), 14(b), 14(c), light distribution patterns HBP21, HBP22, HBP23 which are used to illuminate partially the second light illumination area SA2 can be set a light distribution pattern which can be expanded gradually from an upper area lying above the first illumination area SA1 toward left and right peripheral areas of the second illumination area SA2 or can be contracted in an opposite fashion.

Embodiment 7

Figure 15:
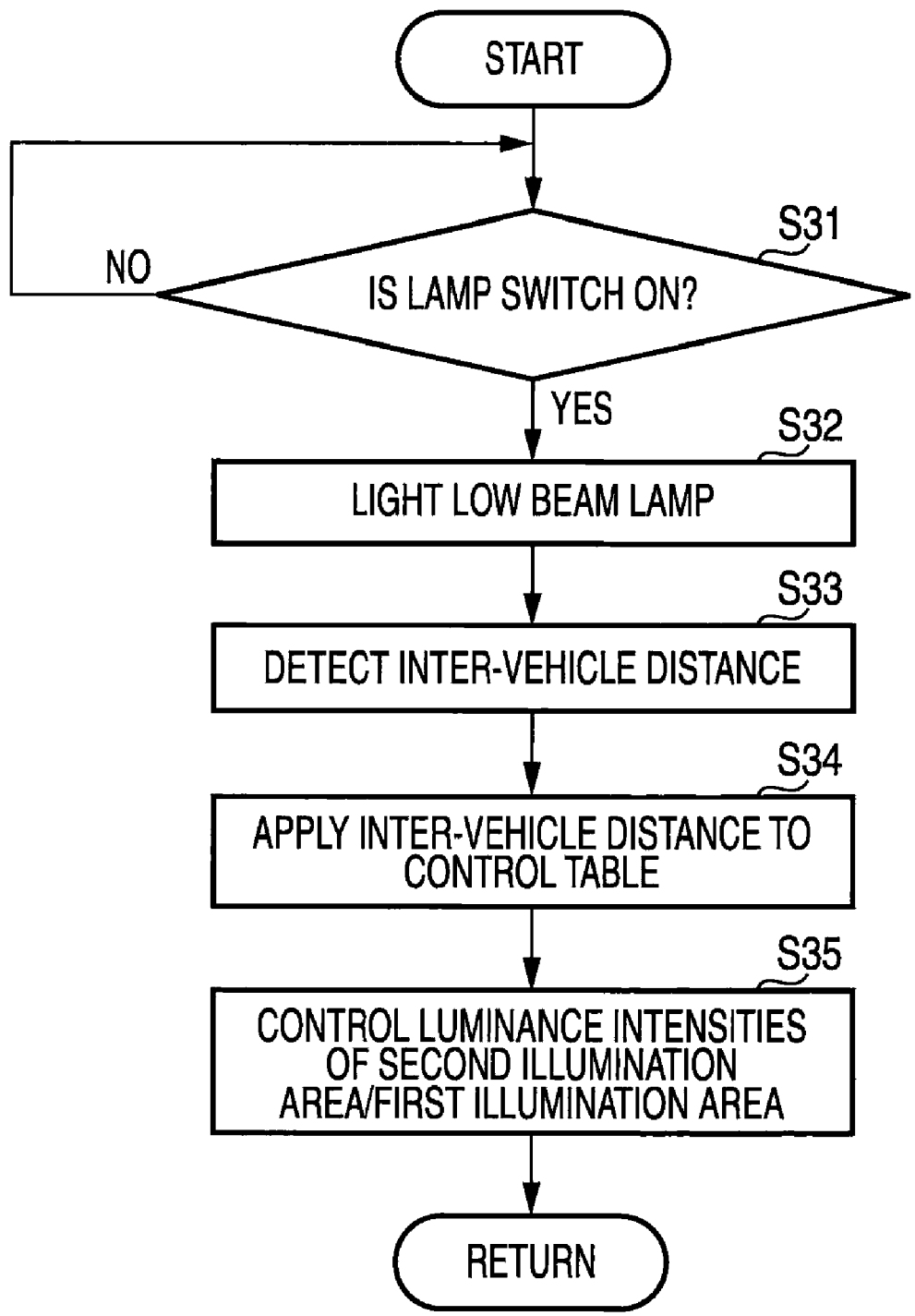
FIG. 15 is a flowchart illustrating an illumination control operation according to Embodiment 7.
Figure 16:
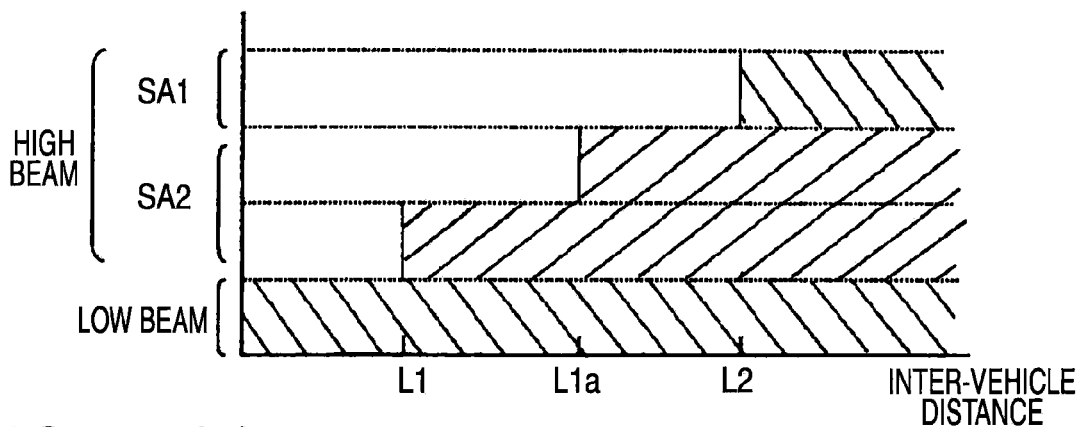
FIG. 16 illustrates property diagrams of control tables of Embodiment 7 and a modified example thereto.
Figure 16:
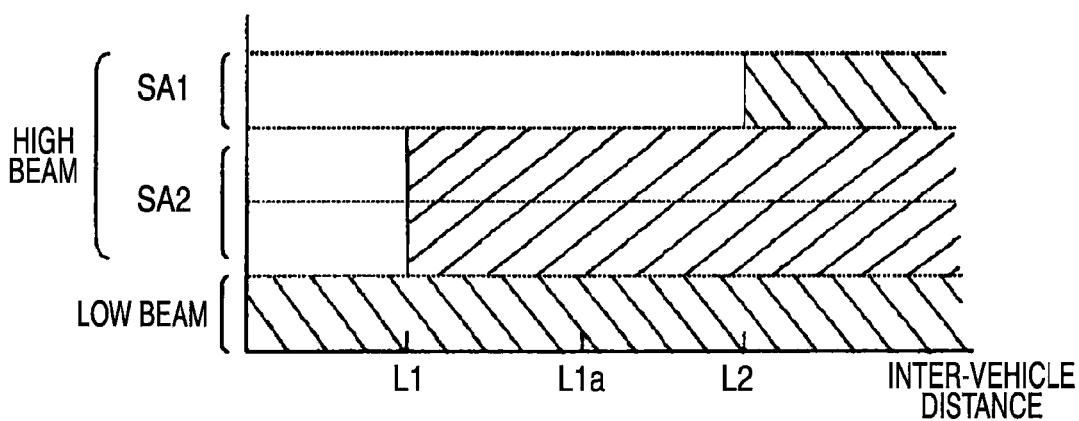
Figure 16:
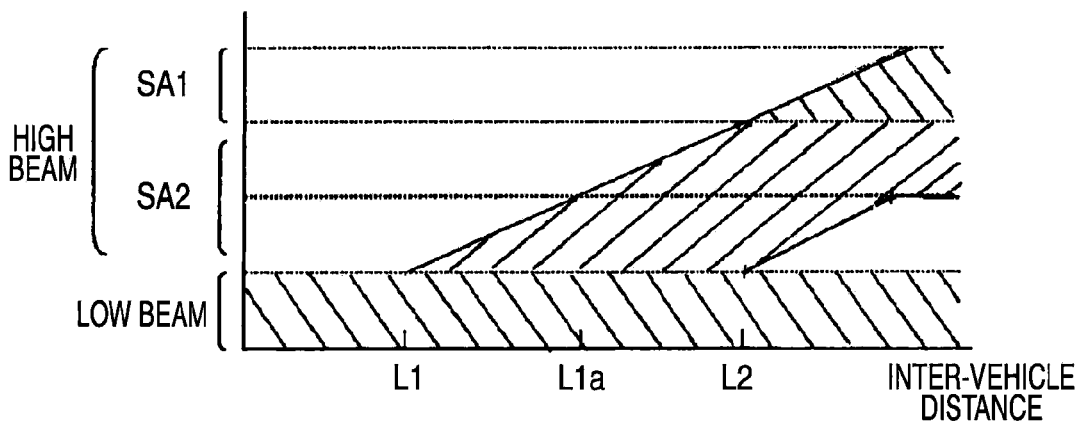

A seventh embodiment (Embodiment 7) is an example in which, when an inter-vehicle distance to a preceding vehicle becomes equal to or larger than a predetermined inter-vehicle distance, the luminance intensity of a second illumination area or a first illumination area is controlled. FIG. 15 shows a flowchart of the control performed. When a lamp switch LSW is switched on (S31), low beam lamps RLBL, LLBL are lit (S32). In this state, a preceding vehicle detection unit FMD detects, for example, a preceding vehicle and detects an inter-vehicle distance between the subject vehicle and the preceding vehicle (S33). A lighting control means ECU applies the inter-vehicle distance so detected to a control table that is set in advance (S34) and controls to change the luminance intensities of a second illumination area SA2 and a first illumination area SA1 based on luminance intensities obtained from the control table (S35). This control table stores correlations between inter-vehicle distances and luminance intensities of the first and second illumination areas. For example, an example of a property of controlling to change a luminance intensity relative to an inter-vehicle distance of the control table is shown in FIG. 16(a). In this figure, the abscissas axis denotes inter-vehicle distance, and the ordinates axis denotes low beam illumination area and high beam illumination area, or first and second illumination areas in, in particular, the high beam illumination area. Illuminated areas are indicated as shaded with oblique lines. As is shown in the figure, when the inter-vehicle distance is smaller than a first predetermined distance L1, illumination is implemented by the low beams. When the inter-vehicle distance becomes equal to or larger than L1, the luminance intensity of the second illumination area SA2 is increased further. This state is maintained until the inter-vehicle distance reaches a first-a or 1a predetermined distance L1a which is larger than the first predetermined distance L1. When the inter-vehicle distance becomes equal to or larger than the 1a predetermined distance L1a, the luminance intensity of the second illumination area SA2 is increased even more. Then, this state is maintained until the inter-vehicle distance reaches a second predetermined distance L2. When the inter-vehicle distance becomes equal to or larger than the second predetermined distance L2, the luminance intensity of the first illumination area SA1 is increased. In this embodiment, the first predetermined distance L1 and the second predetermined distance L2 correspond, respectively, to the first predetermined distance and the second predetermined distance of Embodiment 2 described above.

For example, when this is applied to the high beam lamp of Embodiment 5 shown in FIG. 10, the lighting control means ECU sets the shade 26a of the rotary shade 26 when the inter-vehicle distance is smaller than the first predetermined distance L1, so as to form a low beam as shown in FIG. 11(a). When the inter-vehicle distance becomes equal to or larger than the first predetermined distance L1, the lighting control means ECU sets the shade 26b, so that only both side areas of the second illumination area SA2 are illuminated as shown in FIG. 11(b). When the inter-vehicle distance becomes equal to or larger than the 1a predetermined distance L1a, the lighting control means ECU switches the shades of the rotary shade 26 to the shade 26c, so that almost the whole area of the second illumination area SA2 is illuminated as shown in FIG. 11(c). Then, when the inter-vehicle distance equals or exceeds the second predetermined distance L2, the lighting control means ECU switches the shades of the rotary shade 26 to the shade 26d, so that both the second illumination area SA2 and the first illumination area SA1 are illuminated. Thus, through the series of operations described above, the lighting control means ECU controls the luminance intensities of the second illumination area SA2 and the first illumination area SA1 in accordance with the inter-vehicle distance between the subject vehicle and the preceding vehicle. In particular, the second illumination area SA2 can be illuminated with the two different levels of luminance intensity. In addition, by setting the luminance intensity depending upon inter-vehicle distance as described above, when the subject vehicle is traveling with the inter-vehicle distance to the preceding vehicle held constant, the second illumination area SA2 and the first illumination area SA1 are illuminated with the luminance intensity associated with the inter-vehicle distance in question. In particular, the second illumination area SA2 can be illuminated with the different levels of luminance intensity in accordance with the inter-vehicle distance as shown in FIGS. 11(b), 11(c).

Figure 17:
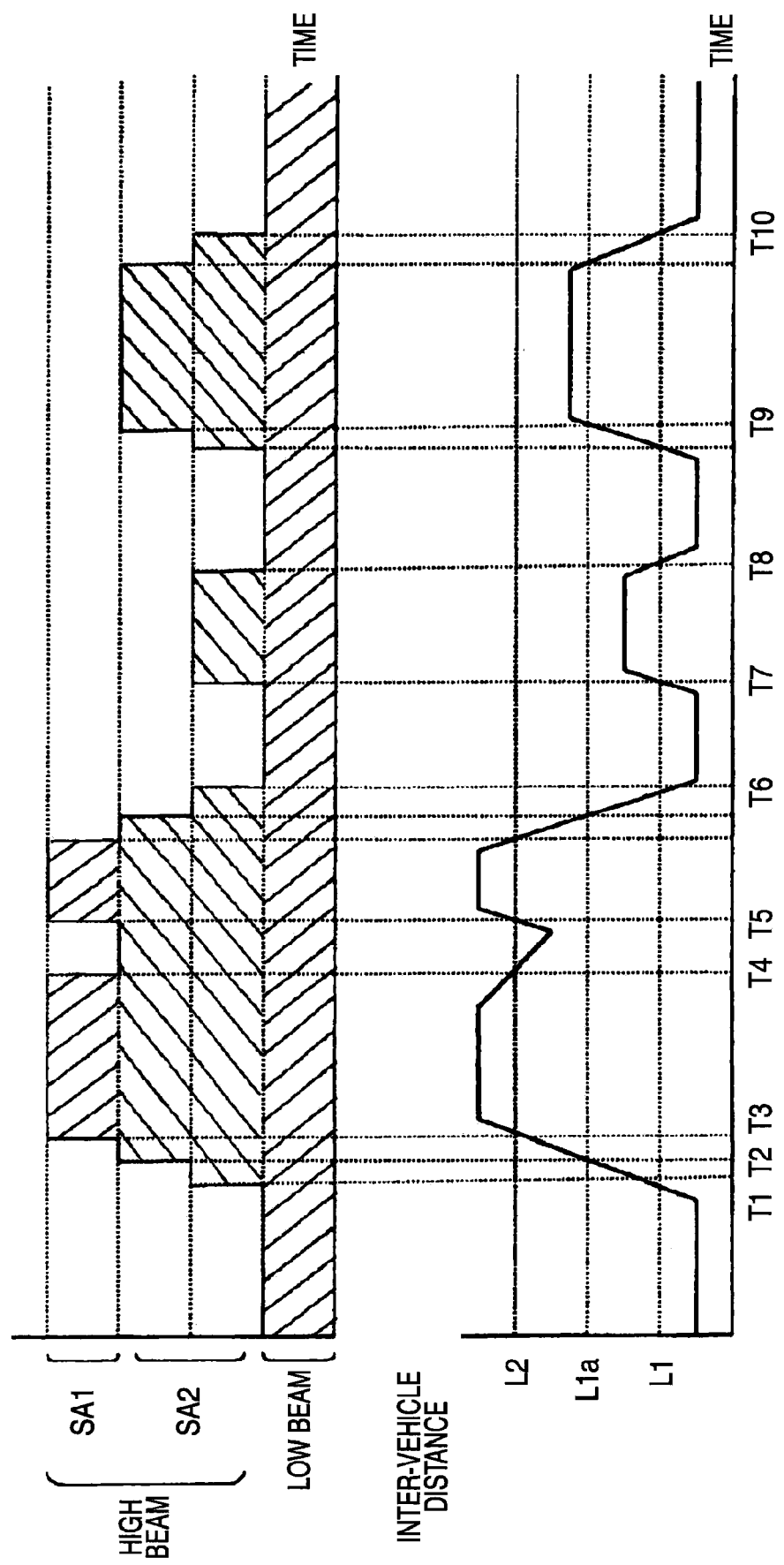
FIG. 17 is a timing chart showing correlations between inter-vehicle distance and illuminating state according to Embodiment 7.

For example, FIG. 17 is an example of a timing chart which shows correlations between inter-vehicle distance and illuminating state. When the inter-vehicle distance is smaller than L1 (<T1), the illumination is implemented by the low beams. However, when the inter-vehicle distance to the preceding vehicle increases and becomes equal to or larger than the first predetermined distance L1 (T1), the luminance intensity illuminates part of the left and right areas of the second illumination area SA2, whereas when the inter-vehicle distance becomes equal to or larger than the 1a predetermined distance (T2), the luminance intensity illuminates almost the whole area of the second illumination area SA2. Then, when the inter-vehicle distance becomes equal to or larger than the second predetermined distance L2 (T3), the luminance intensity illuminates the first illumination area SA1, whereby the high beam results. Thereafter, in the event that the inter-vehicle distance becomes smaller than the second predetermined distance L2 (T4 to T5), the illumination of the first illumination area is stopped, and the luminance intensity thereof is decreased. In addition, as the inter-vehicle distance decreases so as to become smaller than the second predetermined distance L2 or the 1a predetermined distance L1a, the luminance intensities of the first illumination area SA1 and the second illumination area SA2 are decreased sequentially, and when the inter-vehicle distance becomes smaller than the first predetermined distance L1 (T6), the illumination by the low beams is restored. On the other hand, with the inter-vehicle distance held substantially constant, when the inter-vehicle distance is held between the first predetermined distance L1 and the 1a predetermined distance L1a (T7 to T8), the second illumination area SA2 is held to the luminance intensity which illuminates only part of the left and right areas of the second illumination area SA2. In addition, when the inter-vehicle distance is held between the 1a predetermined distance L1a and the second predetermined distance L2 (T9 to T10), the second illumination area SA2 is held to the luminance intensity which illuminates the whole area of the second illumination area SA2. In these cases, there occurs no situation where the first illumination area SA1 is illuminated. In this way, by controlling the change in the luminance intensities of the second illumination area SA2 and the first illumination area SA1 according to the inter-vehicle distance, the luminance intensity of the illumination areas lying ahead of the subject vehicle is controlled to be stable, whereby the driver does not feel the sensation of physical disorder, and the driver of the preceding vehicle is prevented from being dazzled, while the forward visibility of the subject vehicle can be enhanced.

Figure 12:
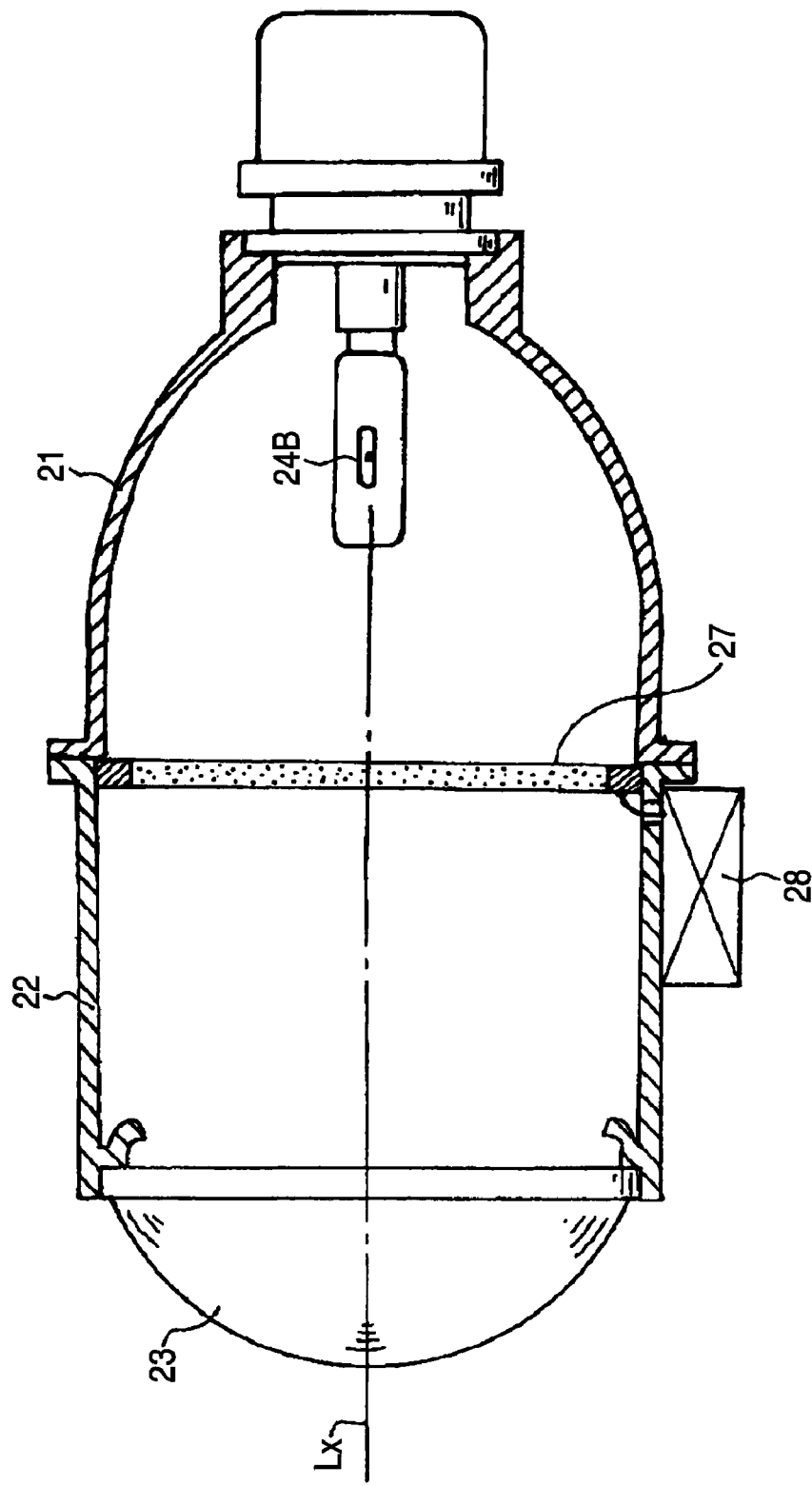
FIG. 12 is a sectional view showing a schematic configuration of a headlamp of Embodiment 6.

While the high beam lamp of Embodiment 5 illustrates an example in which the luminance intensity of the second illumination area SA2 is changed in two steps while the luminance intensity of the first illumination area SA1 is changed in a single step, by increasing the number of shades of the rotary shade 26, the luminance intensity of the second illumination area SA2 can be configured so as to be changed in more steps (e.g., three or more steps). In addition, Embodiment 7 may be applied not only to the high beam lamp of Embodiment 5 but also to the high beam lamp of Embodiment 6 shown in FIG. 12. In this case, too, by controlling the variable shaft 27 more precisely, the second illumination area SA2 and the first illumination area SA1 can be controlled more precisely with respect to their luminance intensities.

Furthermore, Embodiment 7 can be applied to the vehicle lamp of Embodiment 1 or Embodiment 3. However, as the lamp of Embodiment 1 is configured so that the illumination of the light sources is switched, the luminance intensities of the second illumination area SA2 and the first illumination area SA1 can be changed only in a single step, and consequently, the second illumination area SA2 and the first illumination area SA1 are controlled to the single level of luminance intensity. Namely, the property of the control table in this case becomes a two-stage configuration of the second illumination area SA2 and the first illumination area SA1 as is shown in FIG. 16(b). On the other hand, as the lamp of Embodiment 3 is configured so that the luminance intensity is controlled by shifting the collective lens 23 in the optical axis direction, the luminance intensities of the second illumination area SA2 and the first illumination area SA1 can be adjusted in a stepless fashion. Namely, the property of the control table becomes such as shown in FIG. 16(c) in which the headlamp is switched from the low beam towards the high beam in a straight-line fashion. However, in this case, as the lamp are such that the beam shape is controlled to change from an annular shape to a circular shape, the property results in which as the luminance intensity of the first illumination area SA1 increases, the luminance intensity of the second illumination area SA2 decreases.

In the foregoing description, the luminance intensities of both the second illumination area SA2 and the first illumination area SA1 are described as being controlled, and a configuration may be adopted in which the luminance intensity of only the second illumination area SA2 is controlled, or a configuration may be adopted in which the luminance intensity of only the first illumination area SA1 is controlled. In addition, although in Embodiment 7 the luminance intensities of the first and second illumination areas relative to the inter-vehicle distance are set based on the control table, a lighting control may be implemented while calculating an appropriate luminance intensity relative to an inter-vehicle distance by making use of a computer including predetermined operation expressions.

The preceding vehicle detection unit FMD for detecting an inter-vehicle distance to a preceding vehicle is not limited to the image recognition device VP which utilizes the image sensing camera CAM described in Embodiment 1. Hence, it is possible to use a distance sensor for measuring a distance to a preceding vehicle using radio waves such as millimeter waves or micro waves, a position operation sensor which calculates an inter-vehicle distance based on position information on the subject vehicle and other vehicles obtained from a GPS senor or a mutual position operation means which calculates an inter-vehicle distance based on information obtained through road-to-vehicle communications or vehicle-to-vehicle communications.

Other implementations are within the scope of the claims.

What is claimed is:

1. A vehicle lamp arranged to switch between a low beam and a high beam, the high beam illuminating a first illumination area, which lies ahead of and square to a center of a vehicle, and a second illumination area, which includes portions lying horizontally further leftwards and right wards and vertically further upwards than the first illumination area, the vehicle lamp comprising:

a lighting control means arranged to control a lighting state of the vehicle lamp so that when switching from the low beam to the high beam, the lighting control means increases the luminous intensity of the second illumination area and thereafter increases the luminous intensity of the first illumination area, and when switching from the high beam to the low beam, the lighting control means decreases the luminance intensity of the first illumination area and thereafter decreases the luminance intensity of the second illumination area; and a preceding vehicle detection means for detecting a vehicle ahead of a subject vehicle, wherein the lighting control means is arranged to switch from the low beam to the high beam when an inter-vehicle distance to a preceding vehicle detected by the preceding vehicle detection means is equal to or larger than a first predetermined distance, wherein the lighting control means increases the luminous intensity of only the second illumination area when the inter-vehicle distance to the preceding vehicle is equal to or larger than the first predetermined distance and increases the luminous intensity of the first illumination area when the inter-vehicle distance is equal to or larger than a second predetermined distance which is larger than the first predetermined distance.

2. A vehicle lamp as set forth in claim 1 wherein the second illumination area is defined as any of an annular area which surrounds the first illumination area, areas lying horizontally leftwards and rightwards of the first illumination area or an area lying vertically upwards of the first illumination area.

* * * * *